US012801420B2

(12) United States Patent
Hullahalli

(10) Patent No.: US 12,801,420 B2
(45) Date of Patent: Nov. 17, 2026

(54) MAC ADDRESSES CAPTURING VIRTUAL-TO-PHYSICAL ASSOCIATIONS WITHIN VIRTUAL ENVIRONMENTS

(71) Applicant: AT&T Intellectual Property I, L.P., Atlanta, GA (US)

(72) Inventor: Srinandan Hullahalli, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 384 days.

(21) Appl. No.: 18/491,286

(22) Filed: Oct. 20, 2023

(65) Prior Publication Data

US 2025/0130837 A1 Apr. 24, 2025

(51) Int. Cl.
*G06F 9/455* (2018.01)

(52) U.S. Cl.
CPC .................... *G06F 9/45558* (2013.01); *G06F 2009/45562* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS 8,549,187 B1 * 10/2013 Christopher ........ H04L 61/5038 710/9
2006/0129788 A1 6/2006 Maeda et al.
2010/0205304 A1 8/2010 Chaturvedi et al.
2015/0324216 A1 11/2015 Sizemore et al.
2016/0105350 A1 * 4/2016 Greifeneder .......... H04L 41/046 709/224
2017/0075845 A1 * 3/2017 Kopparthi ........... G06F 13/4027
2017/0155620 A1 6/2017 Bar David
2017/0264684 A1 9/2017 Spillane et al.
2017/0339018 A1 11/2017 Prabhu et al.
2020/0034462 A1 1/2020 Narayanasamy et al.
2020/0042402 A1 2/2020 Padia et al.
2020/0065127 A1 2/2020 Kim et al.
2020/0204450 A1 6/2020 Li et al.
(Continued)

OTHER PUBLICATIONS

Saleh et al., vTopology: Virtual MAC Address Aided Network Slicing in Multi-Tenant Data Centers, Published in: IEEE Network (vol. 37, Issue: 2, Mar./Apr. 2023), pp. 214-221, Oct. 2022, DOI: 10.1109/MNET.106.2100617 (Year: 2022).*

*Primary Examiner* — Eric C Wai
(74) *Attorney, Agent, or Firm* — Guntin & Gust, PLC; Daniel P. Williams

(57) ABSTRACT

Aspects of the subject disclosure may include, for example, identifying a request to initiate a virtual machine including a virtual network interface on a physical host processing system that includes a physical network interface. A location reference to a physical location of the physical network interface is determined and an adapted media access control (MAC) address is adapted to incorporate the location reference according to an association between the virtual network interface and the physical network interface. The adapted MAC address is further associated with the virtual network interface of the virtual machine, such that the physical location of the physical network interface is identifiable from within an environment of the virtual machine via the adapted MAC address. Other embodiments are disclosed.

20 Claims, 11 Drawing Sheets

240

(56) References Cited

U.S. PATENT DOCUMENTS

| | | | |
|---|---|---|---|
| 2021/0211305 | A1 | 7/2021 | Gill et al. |
| 2022/0100862 | A1 | 3/2022 | Vetter et al. |
| 2023/0048343 | A1 | 2/2023 | Hullahalli |

* cited by examiner

200

220

230

260

240

270

280

300

600

MAC ADDRESSES CAPTURING VIRTUAL-TO-PHYSICAL ASSOCIATIONS WITHIN VIRTUAL ENVIRONMENTS

FIELD OF THE DISCLOSURE

MAC addresses capturing virtual-to-physical associations within virtual environments.

BACKGROUND

Virtualization represents one approach for optimizing available hardware resources. Accordingly, virtualization may be used by service providers to deploy network and/or computer equipment in data centers and/or central offices. Virtualization be applied to any combination of compute resources, memory resources and network access resources. Such approaches are widely used across various industries to save on costs and to facilitate an efficient management of resources.

A virtual machine manager and/or monitor, sometimes referred to as a hypervisor, may include software, hardware and/or firmware configured to facilitate multiple operating systems, termed guests, to run concurrently on a host computer. A hypervisor may act as an intermediary between a physical system, a so-called host, and a virtualized system, a so-called guest by virtualizing any and/or all functions of a compute host, e.g., dividing CPUs, memory and/or network resources into subparts. A hypervisor may be implemented according to software running on a compute host that virtualizes physical resources of the host to facilitate sharing these resources among multiple users and/or multiple workloads. Beneficially, hypervisors may be configured to ensure that only data that needs to be seen by a particular virtual machine (VM) is seen by that VM, thereby ensuring data security. Accordingly, the hypervisor may establish secure lines of demarcation between different VMs.

Each virtual machine may include an associated identifier, e.g., a universal unique identifier (UUID). The UUID may be generated when the virtual machine is initially powered on. The UUIDs of virtual machines may be used for system management in the same manner that a UUID of a physical computer may be used for system management. The UUID may be stored in a system management basic input-output system (SMBIOS) system information descriptor, which may be accessed by probing the hardware, e.g., using an SMBIOS scanning software.

Data centers throughout the IT industry employ a resource sharing approach commonly referred to as single root input/output virtualization (SRIOV) to facilitate improved utilization of network access resources. For example, SRIOV allows a network interface adapter, such as a single network interface card (NIC) or even a single port of a multi-port NIC, to support multiple VMs. Such virtual environments are configured to share a single PCI express hardware interface. This feature provides multiple tenants to use a shared physical network interface card and yet maintain the separation of network for security and performance mainly.

BRIEF DESCRIPTION OF THE DRAWINGS

Reference will now be made to the accompanying drawings, which are not necessarily drawn to scale, and wherein.

DETAILED DESCRIPTION

Figure 1:
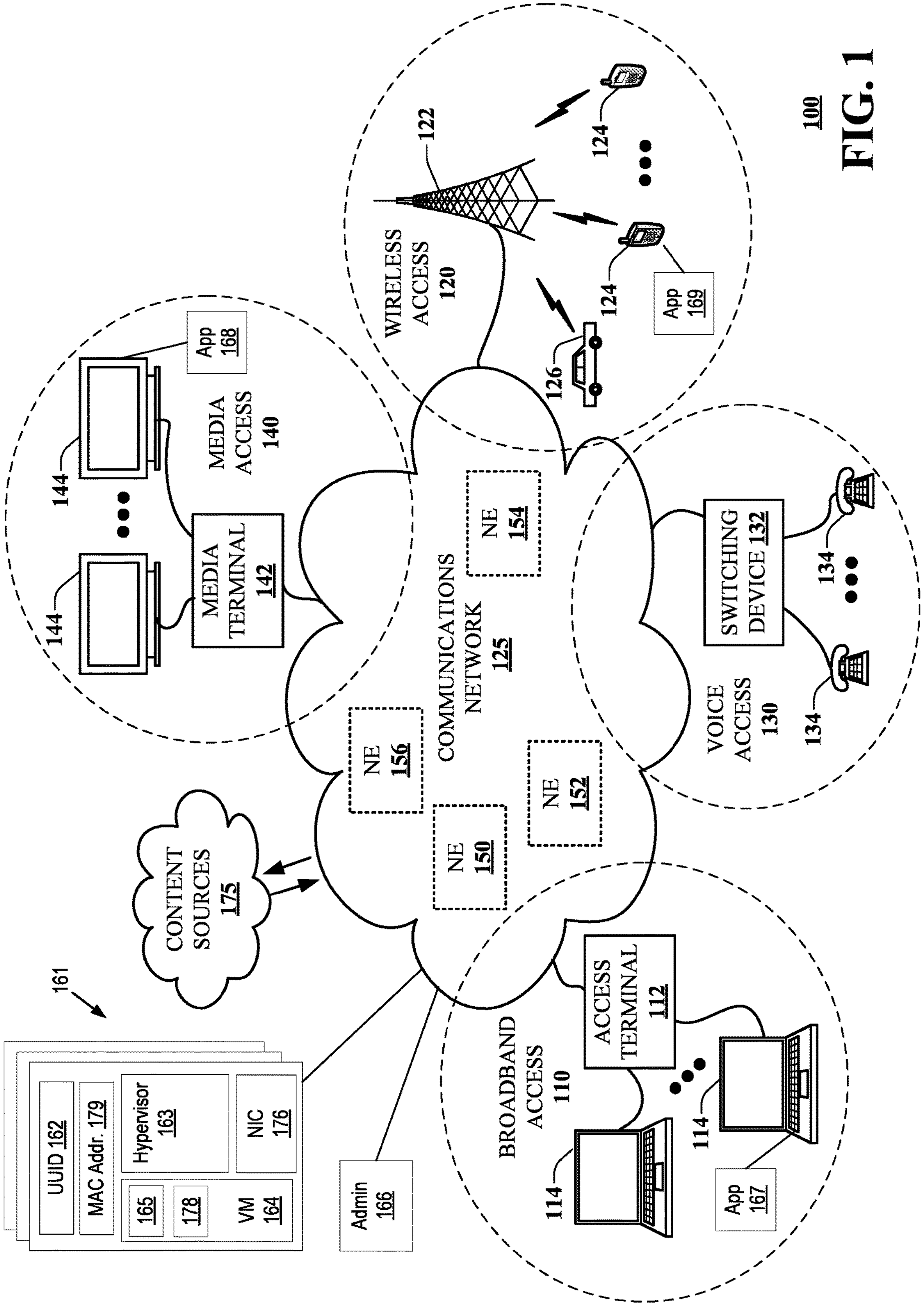
FIG. 1 is a block diagram illustrating an exemplary, non-limiting embodiment of a communications network in accordance with various aspects described herein.

The subject disclosure describes, among other things, illustrative embodiments for adapting MAC addresses incorporating information that identifies associations between virtual machines and physical hardware hosting operations of the virtual machines. Beneficially, the MAC addresses adapted according to the techniques disclosed herein facilitate identification of associated physical resources from within a virtual environment. Other embodiments are described in the subject disclosure.

One or more aspects of the subject disclosure include a process that includes detecting, by a processing system including a processor, a request to initiate a virtual machine on a physical host processing system, wherein the physical host processing system comprises a physical network interface and wherein the virtual machine comprises a virtual network interface. The process further includes discovering, by the processing system, an association between the virtual network interface and the physical network interface, detecting, by the processing system, a physical location of the physical network interface, and generating, by the processing system, a physical location reference to the physical location of the physical network interface. A descriptive MAC address is generated by the processing system, wherein the descriptive MAC address incorporates the physical location reference, and the descriptive MAC address is assigned by the processing system to the virtual network interface of the virtual machine, the physical location of the physical network interface being identifiable from within an environment of the virtual machine via the descriptive MAC address.

One or more aspects of the subject disclosure include a device having a processing system that includes a processor and a memory that stores executable instructions. The instructions, when executed by the processing system, facilitate performance of operations, which include receiving a request to initiate a virtual machine on a physical host processing system, wherein the physical host processing system comprises a physical network interface and wherein the virtual machine comprises a virtual network interface. The operations further include determining an association between the virtual network interface and the physical network interface, obtaining a location reference to a physical location of the physical network interface, and adapting a virtual MAC address, wherein the virtual MAC address incorporates the location reference. The virtual MAC address is assigned to the virtual network interface of the virtual machine, the physical location of the physical network interface being identifiable from within an environment of the virtual machine via the virtual MAC address.

One or more aspects of the subject disclosure include a non-transitory, machine-readable medium, including executable instructions that, when executed by a processing system including a processor, facilitate performance of operations. The operations include identifying a request to initiate a virtual machine on a physical host processing system, wherein the physical host processing system comprises a physical network interface and wherein the virtual machine comprises a virtual network interface, obtaining a location reference to a physical location of the physical network interface, and adapting a virtual MAC address, wherein the virtual MAC address incorporates the location reference according to an association between the virtual network interface and the physical network interface. The virtual MAC address is associated with the virtual network interface of the virtual machine, the physical location of the physical network interface being identifiable from within an environment of the virtual machine via the virtual MAC address.

Hypervisors may be distinguished according to at least two general categories. Namely, type 1 hypervisors are configured to run directly on top of a compute hosts hardware. Accordingly, a VM operating system may be hosted over a hypervisor, which, in turn, may be hosted over hardware of the compute host. Type 1 hypervisors, sometimes referred to as a native or "bare metal" configurations, may control hardware and/or manage VMs, e.g., as a type of operating system. Examples of type 1 hypervisors include, without limitation, Xen, VMware's ESXi, Microsoft's Hyper-V and Kernel-based Virtual Machines (KVMs). Alternatively, type 2 hypervisors may be configured as application programs running on top of conventional operating systems. Accordingly, a VM operating system may be hosted over a hypervisor, which may be hosted over an operating system of the compute host, which, in turn, may be hosted over hardware of the compute host. Type 2 hypervisors are sometimes referred to as "hosted" configurations. Examples of type 2 hypervisors include, without limitation, VMware Workstation, VMware Player, VirtualBox, or Parallels Desktop for Apple's Mac computers.

One example of a hypervisor is a Kernel-based Virtual Machine (KVM). The KVM is an open-source virtualization technology built into the Linux® operating system that provides hypervisor functionality. The KVM supports one or more virtual machines (VMs) of one or more various operating systems alone or in combination with their own specific applications on a single physical hardware platform. Example operating systems include the Linux® operating system, other variants such as Red Hat® operating system, Ubuntu® and/or Windows® operating systems. By design, virtual machines may be isolated from each other to appear as independent servers to an end user and/or client applications.

A KVM (Kernel-based Virtual Machine) is a virtualization module provided in the Linux® kernel that allows the kernel, a portion of the operating system code always resident in memory that facilitates interactions between hardware and software components, to function as a hypervisor. The KVM provides tools to create, or "spin-up," virtual machines, including automatic generation of a UUID. Applications using the virtual machines may access the virtual machines, but they do not necessarily reveal where the virtual machine is running, i.e., upon which host processing system.

Heretofore, the underlying virtual machine would have no idea on which host it would be running on or which physical network interface it may be associated. Neither would underlying VM have access to its parent hypervisor. Unless the host and/or physical network interface identity information is known in advance, it would not be possible to determine which host a specific virtual machine may be running on and/or which physical network interface it may utilize for any external network activity. Others have used separately generated and maintained mapping tables to identify such associations. For example, a spreadsheet, a database, and/or some other custom tool may be employed to keep track of virtual machines and their associated host processing systems. Unfortunately, such tables may be very large and require constant tracking and updating. Such processes would be cumbersome as the number of virtual machines and/or hosting processors may be very large, e.g., numbering in the hundreds and/or thousands, or more.

One common method used to address the problem of identifying a host includes the use of virsh linux host utility, and/or opensource and commercial tools such as virt-manager, and/or some form of KVM manager, to retrieve information from a stored database/excel document. Customized scripts may be provided to scan physical hosts and their virtual machines to gather the needed info from a hypervisor host. Identifying a virtual machine from a hypervisor host may be relatively straightforward; however, the opposite may prove exceedingly difficult if not impossible.

At least one approach for identifying a host uses a modified UUID for virtual machines that includes a fixed part, e.g., obtained from a parent UUID of the physical host, and a definable and/or variable part, as may be determined for the particular virtual machine. Further details regarding correlation of a VM to a host within a virtual domain are disclosed in U.S. patent application Ser. No. 17/395,066, filed on Aug. 5, 2021, the entire contents of which are incorporated herein by reference. In at least some embodiments, a hypervisor may refer to an external file, e.g., a template, to spin up a virtual machine. The hypervisor may be adapted to dynamically generate modified UUIDs when generating virtual machines according to an external file/template. Use of the modified UUIDs including a reference to the host/parent, eliminates any need for retaining and/or relying on separately generated mappings. In order to determine physical host identity, simply examine the modified UUID of the virtual machine, parse out the fixed part and use that to identify the physical host. Records and/or tables of the modified UUIDs of the VMs may be generated and/or otherwise maintained, which alone sufficiently identifies the virtual machine-to-physical resource mappings by design.

Accordingly, a modified UUID of a virtual machine suitably configured in this manner, may be used to immediately identify a host processor and/or parent hypervisor, without any need to reference an external association mapping, spreadsheet and/or database or other separately stored record of the pairing. That said, a record, e.g., a listing, of host processor and/or parent hypervisor UUIDs may be used, e.g., referenced, to facilitate interpretation of the modified UUID. Such a virtual machine pairing table based on modified UUID may be generated according to a relatively simple method, e.g., by collect modified UUIDs and a listing of the virtual machines, and generating a data record, table and/or database record of host and/or parent hypervisor to virtual machine pairings based on the modified UUIDs.

Alternatively, or in addition, a hypervisor may be adapted to dynamically generate modified MAC addresses when generating virtual machines. In at least some embodiments, the modified MAC addresses may be generated according to information identifying a physical host and/or physical network interface(s), e.g., being obtained from an external file/template. Use of the modified MAC addresses including a reference to any associated network interfaces, eliminates any need for retaining and/or relying on separately generated mappings. For example, in order to determine a physical network interface, a modified MAC address associated with the virtual machine may be simply examined, parsing out a modified part and using that to identify a physical network interface. A record or table of the modified MAC addresses of the VMs may be generated and/or otherwise maintained, which alone sufficiently identifies the virtual machine-to-network interface mappings by design.

Accordingly, a modified MAC address of a virtual machine suitably configured in this manner, may be used to immediately identify an associated physical network interface adapter resource and/or parent hypervisor, without any need to reference an external association mapping, spreadsheet and/or database or other separately stored record of the pairing. That said, a record, e.g., a listing, of physical network interface adapter resources and/or virtual NICs may be used, e.g., referenced, to facilitate interpretation of the modified MAC address. Such a virtual NIC pairing table based on modified MAC addresses may be generated according to a relatively simple method, e.g., by collecting modified MAC addresses and a listing of the virtual NICs, and generating a data record, table and/or database record of physical network interface adapter resources and/or to virtual NIC and/or virtual machine pairings based on the modified MAC addresses.

Referring now to FIG. 1, a block diagram is shown illustrating an example, non-limiting embodiment of a system 100 in accordance with various aspects described herein. For example, system 100 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine. Alternatively, or in addition, the system 100 can facilitate in whole or in part the identifying of a request to install a guest virtual machine on a physical host, the identifying of an associated physical network interface adapter, the identifying of a virtual machine reference value, and the generating, modifying and/or adapting of a MAC address of the guest virtual machine to obtain a modified, e.g., a descriptive MAC address. The modified MAC address includes a physical resource reference value, which may be assigned to the guest virtual machine to facilitate identification of the physical network resource, e.g., an expansion slot and/or port, via the modified MAC address. Accordingly, an identity of an associated physical network interface adapter may be determinable from within an environment of the virtual machine, e.g., from inspection of the modified MAC address, without requiring access to other environments and/or resources, such as the hypervisor and/or virtual-to-physical resource tables or mappings.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, the communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system includes one or more physical host processing systems, referred to herein as host processors or simply hosts 161. The hosts 161 may include servers, e.g., at one or more datacenters, desktop computers, laptop computers, and the like. The hosts 161 are adapted to run one or more virtual machines 164, sometimes referred to as guest machines or simply guests. At least some of the hosts 161 may include a software body or software layer, sometimes referred to as a hypervisor 163, upon which multiple virtual machines are created and managed. Alternatively, or in addition, at least some of the hosts 161 may include a virtual machine manager, sometimes referred to as a virtual machine monitor (VMM) which may be provided as part of a hypervisor 163 and/or as a separate module configured to operate in cooperation with the hypervisor 163. The hypervisor 163 includes computer software, firmware and/or hardware that creates, runs and/or facilitates management and/or monitoring one or more of the virtual machines 164. The hypervisor 163 may configure the guest virtual machine 164 with a virtual operating platform including a guest operating system. The hypervisor 163 may manage the execution of the guest operating systems, in at least some instances, providing a variety of different operating systems that share common virtualized hardware resources. Operating systems may include, without limitation, Linux® operating systems, Windows® operating systems, and macOS® operating systems and the like.

Computer hardware, such as the hosts 161, virtual hardware, such as the virtual machines 164, and/or information may be associated with an identifier to facilitate organization of computing and/or communication systems and/or the management of information upon such systems. At least one widely adopted identifier is referred to as a universally unique identifier (UUID). The example hosts 161 include respective UUIDs 162. The UUIDs 162 may include 128-bit, 36-character strings, typically presented with four hyphens as standardized by the ISO, IETF and the ITU. At least a portion of the UUID may include a unique host identifier. Other components of the UUID 162 may include, without limitation, a timestamp, an address family identifier, and so on. According to the illustrative example, the UUIDs 162 are stored in nonvolatile memory, e.g., within the BIOS, of their respective hosts 161.

The virtual machines, acting as independently manageable compute environments, may also be configured with identifiers. In at least some embodiments, the virtual machine identifiers may confirm to the same standards as used in the hosts 161. The example virtual machines 164 are configured with respective UUIDs, sometimes referred to as private UUIDs 165. The private UUIDs 165 may be stored within a virtualized environment, e.g., with a BIOS portion of the virtualized environment as may be provided within a BIOS portion of the virtual machine 164.

In at least some embodiments, the host 161 may include at least one physical network interface adapter 176, sometimes referred to as a network interface card (NIC). The physical network interface adapter 176 may be configured to facilitate network access to the virtual machine 164. In at least some embodiments, a network adapter function may be virtualized, such that a virtual network interface device 178 may be associated with at least a portion of the physical network interface adapter 176. For example, the virtual network interface device 178 may be associated with at least one physical port of the physical network interface adapter 176. In at least some embodiments, the hypervisor 163 generates a modified, e.g., descriptive, MAC address 179 for each virtual network interface device 178 associated with, or attached to, each VM 164. In at least some embodiments, the descriptive MAC address 179 may adhere to a standardized MAC address format, e.g., the 48-bit Extended Unique Identifier (EUI-48) and/or the 64-bit Extended Unique Identifier (EUI-64) as may be used for used for IEEE 802 compliant, universally unique MAC addresses. However, instead of being determined by an equipment manufacturer, e.g., according to the IEEE 802 universally unique MAC addresses, the descriptive MAC address 179 may be generated, adapted and/or otherwise modified to incorporate at least a portion that identifies a physical network adapter resource. For example, one portion of a descriptive MAC address 179 may identify a respective host 161 or physical machine hosting the VM 164, e.g., according to its UUID, while another portion of the descriptive MAC address 179 may identify a physical network interface adapter 176 resource, e.g., the NIC. In at least some embodiments, the NIC may be identified within a portion of the descriptive MAC address 179 according to an expansion slot identifier or number and/or a NIC port identifier and/or number. In at least some embodiments, the descriptive MAC address 179 includes a random portion that ensures uniqueness at least within a deployment within a local realm, such as a local area network and/or an enterprise network. According to the illustrative example, the descriptive MAC address 179 may be stored in nonvolatile memory, e.g., within the BIOS, of their respective hosts 161. Alternatively, or in addition, the modified, adjusted and/or otherwise generated, e.g., descriptive MAC addresses, may be stored within the virtualized environment, e.g., with the BIOS portion of the virtualized environment as may be provided within a BIOS portion of the virtual machine 164.

In at least some embodiments, the system 100 includes an administrative function 166 that may be adapted to manage and/or monitor virtualized resources, such as the virtual machines 164, associations of VMs with physical network interface adapters 176, and/or the hypervisors 163. The administrative function 166 may be included within an operation and maintenance (O&M) function, allowing for operation and maintenance of physical as well as virtualized resources. The administrative function 166 may be implemented as a service and/or as software hosted on a server. The administrative function 166 may operation in cooperation with one or more of the hypervisors 163 to create, commission, and/or instantiate new virtual machines 164, and/or to create, commission, and/or manage new virtual network interfaces, and/or to associate resources of physical network interface adapters 176 to the virtual machines 164, and/or to migrate virtual machines 164 from one host 161 to another, and/or to decommission virtual machines 164, as may be necessary to serve demands of one or more client applications.

Example client applications include, without limitation, broadband applications 167 hosted on data terminals 114 and/or access terminals 112. The broadband applications 167 may access server applications hosted on the virtual machines 164 via a broadband access 110 and/or the example communications network 125. Other examples of client applications include, without limitation, media access applications 168 hosted on smart televisions, e.g., display device 144 and/or media terminals 142, and mobile applications 169 hosted on a vehicle 126, a mobile device 124 and/or the base station or access point 122. The media access applications 168 and mobile applications 169 may access server applications hosted on the virtual machines 164 via their respective access networks 140, 120 and/or via the example communications network 125.

In at least some embodiments, the private UUIDs 165 are generated in cooperation with the hypervisor 163. For example, the hypervisor 163 may generate a private UUID 165 upon creation, commissioning and/or instantiation of a new virtual machine 164. According to the techniques disclosed herein, the hypervisor 163 may identify a host 161, obtain a UUID 162 of the host 161, e.g., probing the host 161 hardware via SMBIOS, to obtain a UUID 162 provided by a manufacturer of the host 161. The hypervisor 163 may generate a virtual machine identifier, e.g., using a random process, such as a random function. The hypervisor 163 may combine at least a portion of the UUID 162, e.g., the host ID portion, with the virtual machine identifier, e.g., a random number, to obtain the private UUID 165. In at least some embodiments, the UUID 162 and the private UUID 165 are compliant with the same standards.

The private UUIDs 165, having been configured with the host ID portion of the UUID 162 may be examined, e.g., by the hypervisor 163 and/or by the administrative function 166, thus revealing a host 161 upon which the virtual machine 164 was created. Accordingly, virtual resources may be managed by their private UUIDs, while also providing insight into which physical resources they are allocated. For example, a hypervisor 163 and/or an administrative function 166 may be configured to monitor one or more performance indicators, e.g., processing speed, memory access, communication performance and so on. The hypervisor 163 and/or the administrative function 166 may be adapted to manage virtualized resources based on the monitored performance indicators. An administrative function 166 may determine that a new virtual machine should be instantiated to satisfy demands of the client applications 167, 168, 169. Alternatively, or in addition, the administrative function 166 may determine that an existing virtual machine 164 of one host 161 should be migrated to another host 161 to improve performance.

Alternatively, or in addition, descriptive MAC addresses 179 are generated, modified and/or otherwise adapted in cooperation with the hypervisor 163. For example, the hypervisor 163 may generate a MAC address upon creation, commissioning and/or instantiation of a new virtual machine 164. In at least some embodiments, the hypervisor 163 generates an initial MAC address to incorporate a random portion that ensures uniqueness at least within the host 161 and/or within a LAN and/or within another network environment, such as an enterprise network. According to the techniques disclosed herein, the hypervisor 163 may identify a host 161, obtain a UUID 162 of the host 161, e.g., probing the host 161 hardware via SMBIOS, to obtain a UUID 162 provided by a manufacturer of the host 161. The hypervisor 163 may identify a physical network interface adapters 176 associated with the new virtual machine 164. Such identifications may include a NIC location, e.g., by reference to a host expansion slot location. To the extent that the NIC includes multiple ports, e.g., a dual port and/or a quad-port NIC, identification of the physical network interface adapters 176 may include identification of an associated port. The hypervisor 163 may combine at least a portion of the UUID 162, e.g., the host ID portion, with the portion identifying the physical network interface adapter 176. In at least some embodiments, the host ID portion may be combined with a virtual machine identifier, e.g., a random number, to obtain the private UUID 165, which may be combined with the portion identifying the physical network interface adapter 176. The resulting descriptive MAC addresses 179 may be compliant with MAC addressing standards.

In at least some embodiments, a physical network interface adapter may be incorporated into a compute host's hardware, e.g., a NIC card built into the host's motherboard, such that a separate LAN card may not be necessary for connection to a LAN. Alternatively, or in addition, a network interface adapter may be configured as a separate module, e.g., a separate network card, configured to interconnect to a compute host processor via a physical interface. Physical interfaces may include, without limitation, physical integration into a host processor motherboard. Alternatively, or in addition, physical interfaces may include, without limitation, an expansion interface that facilitates interconnection of physical devices, such as network interface adapters or NIC cars to a host processing system. In at least some embodiments, the expansion interface includes a bus architecture incorporating one or more electrical connections, leads or contacts. Such bus architectures may include serial bus architectures, parallel bus architectures and/or combinations of both serial and parallel bus architectures.

Figure 2A:
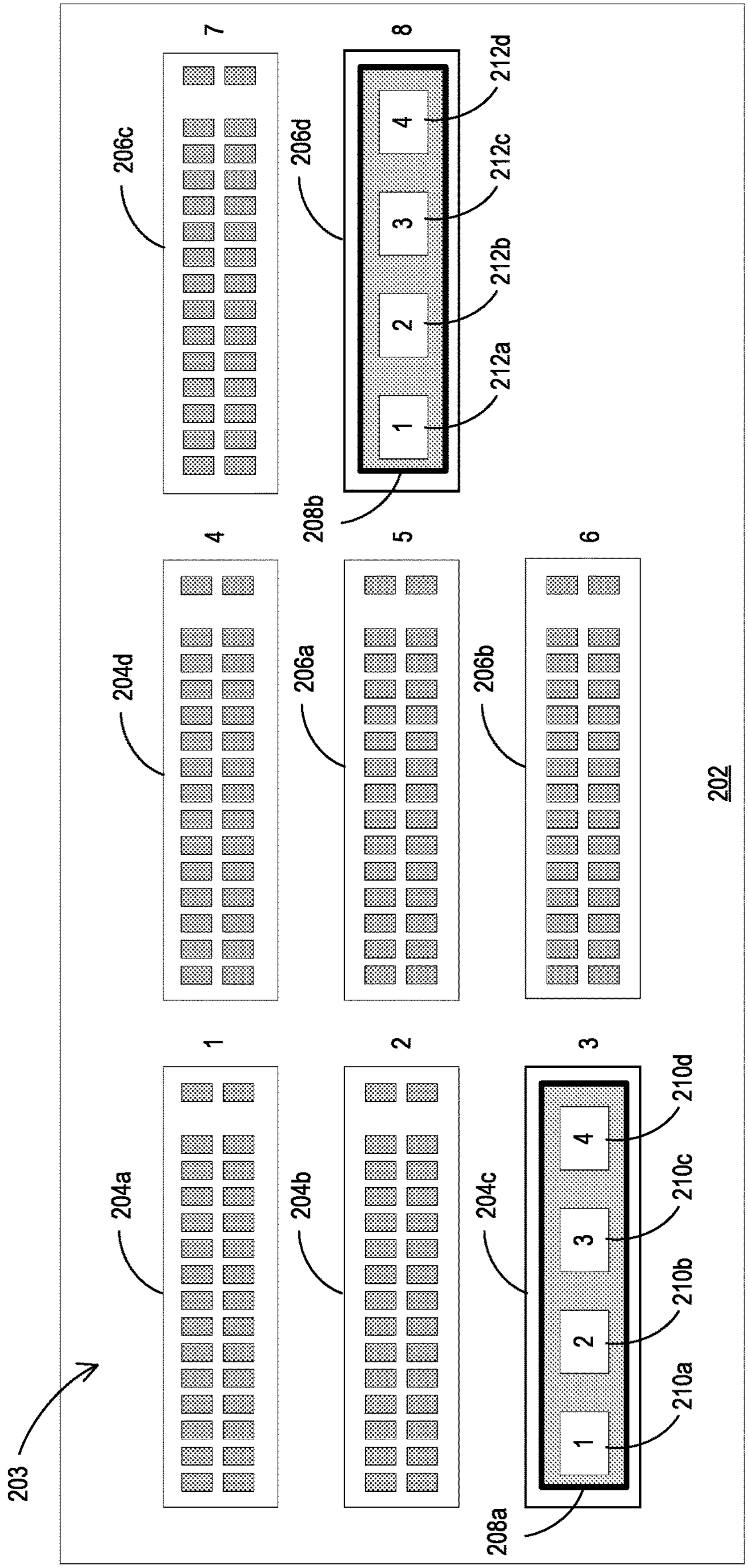
FIG. 2A is a schematic diagram illustrating an example, non-limiting embodiment of a group of physical expansion slots partially populated with network interface adapters functioning within the communication network of FIG. 1 in accordance with various aspects described herein.

With the advancement of technology, network interface adapters are moving to higher throughput data rates. Presently, vendors routinely support higher capacity network cards capable of transferring data from 100 Gbps to as high as 400 Gbps for enterprise applications. FIG. 2A is a schematic diagram illustrating an example, non-limiting embodiment of a group of physical expansion slots 200 partially populated with network interface resources in the form of network interface adapters or NICs functioning within the system 100 of FIG. 1 in accordance with various aspects described herein. According to the illustrative example, a portion of a rear panel 202 of a compute host, e.g., a rack server, includes an arrangement of expansion slots 203, numbered slot 1 through slot 8. In more detail, the expansion slots 203 are arranged according to a first group of slots including a first expansion slot 204*a*, a second expansion slot 204*b*, a third expansion slot 204*c*, and a fourth expansion slot 204*d*, generally 204, and a second group of slots including a fifth expansion slot 206*a*, a sixth expansion slot 206*b*, a seventh expansion slot 206*c*, and an eighth expansion slot 206*d*, generally 206. In this example, the compute host is configured with two CPUs in which the first group of slots 204 in electrical communication with and/or otherwise accessible to the first host CPU-1 (not shown), whereas the second group of slots 206 is in electrical communication with and/or otherwise accessible to the second host CPU-2 (not shown).

By way of example and without limitation, the expansion interface may be configured according to one or more of a universal serial bus (USB) architecture, an industry standard architecture (ISA), a peripheral component interconnect (PCI) architecture, a peripheral component interconnect extended (PCI-X) architecture, and/or a peripheral component interconnect express (PCI-e) architecture. Typically, these types of architectures may be standardized to facilitate interconnection and/or interoperability between components of different vendors. For example, the PCI-e architecture adheres to a corresponding high-speed serial computer expansion bus standard. Thus, a common motherboard interface for personal computers' graphics cards, sound cards, hard disk drive host adapters, SSDs, Wi-Fi and Ethernet hardware connections-PCI uses a shared parallel bus architecture in which a PCI host and all devices share a common set of address, data, and control lines. PCI Express is based on point-to-point topology, with separate serial links connecting every device to the root complex (host).

The expansion slots 203 are designed to accommodate different types of expansion hardware, e.g., in the form of modules, such as circuit card assemblies. Example expansion cards include, without limitation, graphics card adapters, video capture cards, sound cards, television receiver cards, and network interface adapters, e.g., NICs. Any NICs, in turn, may include a circuit board assembly and/or a chip that enables interconnection to one or more networks. The NICs may include at least one physical port configured to connect to a network medium, such as a local area network (LAN). The network interface adapters may act as a middlemen between a data network and a processing system, such as a computer, or server, e.g., including electronic circuitry configured according to data link and/or physical layer standards. Accordingly, a NIC operating as an interface may be configured to transmit signals at a physical layer and deliver data packets at a network layer. It is understood that any communication device, e.g., a node on a LAN, includes at least one network interface adapter or NIC.

At least some network interface adapters may be categorized according to ordinary PC network adapters, e.g., capable of data transmission speeds of 10 Mbps, 100 Mbps, up to perhaps 1 Gbps or higher. PC network adapters are sized to accommodate one compute host, e.g., one PC, to communicate with other PCs, devices and/or networks. Other network adapters may be categorized according to server adapters. Generally, server type network adapters are capable of faster data transmission speeds, such as 10, 25, 40, and/or 100 Gbps. It is understood that any of the techniques disclosed herein may be implemented, without limitation, on either type of network adapter.

Continuing with the illustrative example, a third expansion slot 204*c* is populated by a first network interface adapter 208*a*, which includes four independent ports 210*a*, 210*b*, 210*c*, 210*d*, generally 210. Likewise, an eighth expansion slot 206*d* is populated by a second network interface adapter 208*b*, which also includes four independent ports 212*a*, 212*b*, 212*c*, 212*d*, generally 212. Accordingly, the four ports 210 of the first network interface adapter 208*a* are available to the first host CPU-1, whereas the four ports 212 of the second network interface adapter 208*b* are available to the second host CPU-2.

Figure 2B:
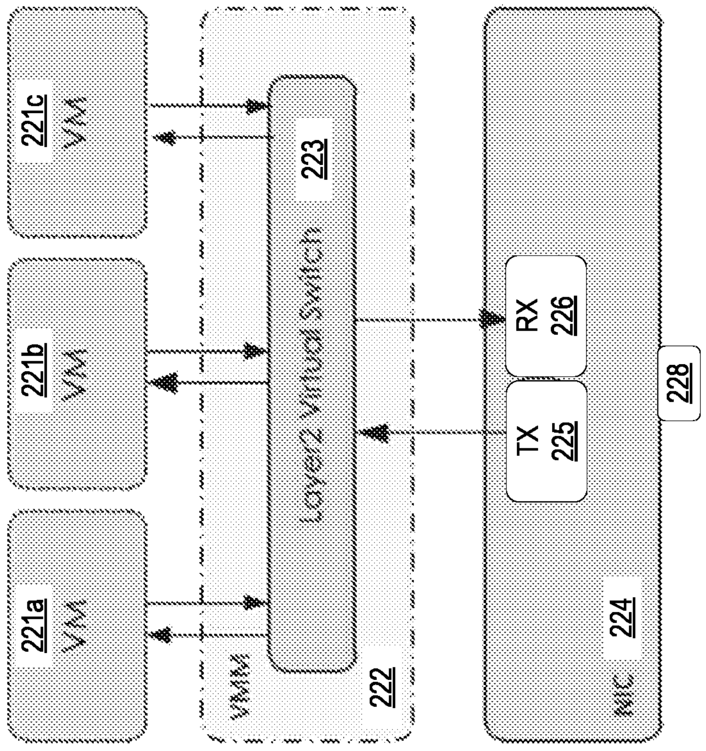
FIG. 2B is a block diagram illustrating an example, non-limiting embodiment of a virtual processing system functioning within the communication network of FIG. 1 in accordance with various aspects described herein.

In at least some embodiments, an efficient use of extreme bandwidths of network interface adapters on a given host may be achieved by virtualizing a network interface adapter or NIC 178 (FIG. 1). FIG. 2B is a block diagram illustrating an example, non-limiting embodiment of a virtual processing system 220 functioning within the system 100 of FIG. 1 in accordance with various aspects described herein. The example virtual processing system 220 includes three VMs 221*a*, 221*b*, 221*c*, generally 221, a virtual machine manager (VMM) 222 and a physical network interface adapter or physical NIC 224. It is understood that other configurations with greater or fewer numbers of VMs 221 and/or physical NICs 224 may be possible. Each of the VMs 221 may be configured to exchange information with one or more external devices via the physical NIC 224. Information exchanges may include, without limitation, the transmission and/or reception of data, e.g., in the form of messages or packets. It is understood that the physical NIC 224 includes at least one network interconnecting interface, e.g., a network interface port 228, or simply port, that generally operates according to some nominal maximum bandwidth. Virtualization permits a sharing of a physical resource of the physical NIC 224, such as a bandwidth of a network port.

The physical NIC 224 includes a transmit function, e.g., a transmitter 225, and a receive function, e.g., a receiver 226. The transmitter 225 and receiver 226 may be configured to facilitate network communications via the network interface port 228. The example VMM 222 includes a communication device that is configured to facilitate a shared access of the network interface port 228 by the three VMs 221. The communication device in this example includes a layer 2 virtual switch 223. Each of the VMs 221 is assigned a respective virtual MAC address, e.g., at a time the VM is initiated or "spun-up." These virtual MAC addresses may be self-generated MAC addresses that include at least a random portion configured to ensure that no two virtual MAC addresses within the particular host are identical. The layer 2 virtual switch 223 may use the shared access to direct message traffic internally between each of the respective VMs 221 and the network interface port 228.

Alternatively, or in addition, a network interface adapter or NIC may be shared among multiple VMs according to a technique referred to as single root input/output virtualization (SRIOV). A SRIOV approach enables a physical port to be virtualized according to virtual functions. Such bandwidth sharing is beneficial as hardly any conceivable requirement would use all the available bandwidth by one application or tenant. As disclosed herein, host systems may run any one or more of the various hypervisors disclosed herein and/or generally known to those skilled in the art, enabling a compute host to support or run the VMs as guests. The guest VMs can be configured to use the virtual functions as virtual network devices, e.g., virtual NICs (vNICs).

In at least some embodiments, SRIOV is applied as an extension to a standard bus specification, such as the PCI Express (PCI-e) specification, allowing a device, such as a network interface adapter, to separate access to its resources among various PCI-e hardware functions. According to at least some embodiments, SRIOV includes at least one physical function (PF), e.g., as a primary function of a device to advertise its SRIOV capabilities. A PF may be associated with a hypervisor parent partition in a virtualized environment. Each VF may be associated with a PF, allowing the VFs to share one or more physical resources of the device, such as a network port, with the PF and other VFs on the device. Each VF may be associated with a hypervisor child partition in a virtualized environment.

Figure 2C:
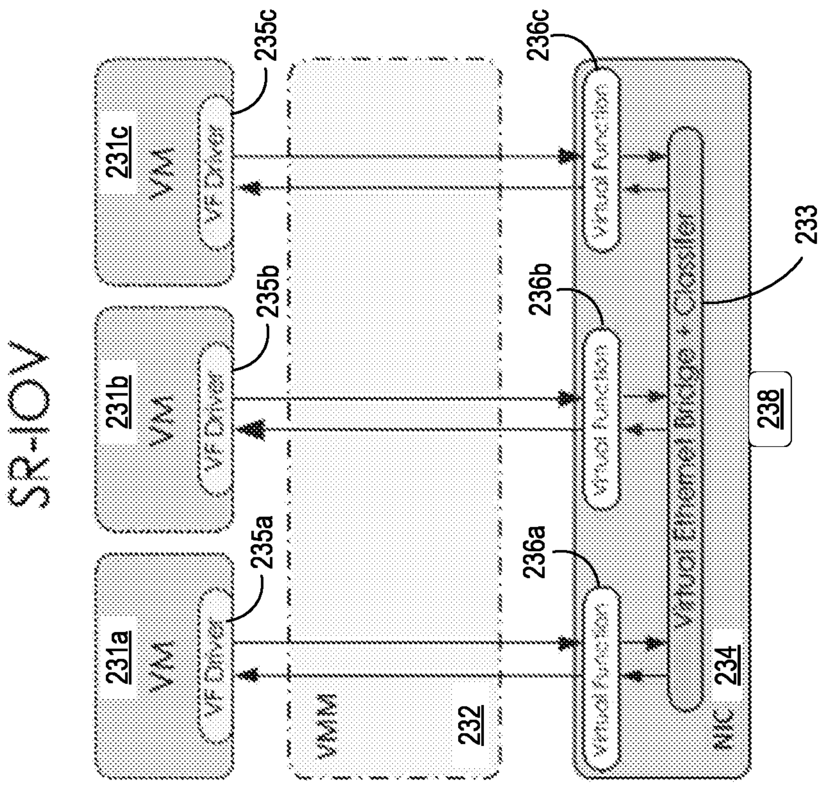
FIG. 2C is a block diagram illustrating an example, non-limiting embodiment of another virtual processing system functioning within the communication network of FIG. 1 in accordance with various aspects described herein.

FIG. 2C is a block diagram illustrating an example, non-limiting embodiment of another virtual processing system 230 functioning within the system 100 of FIG. 1 in accordance with various aspects described herein. The example virtual processing system 230 includes three VMs 231*a*, 231*b*, 231*c*, generally 231, a virtual machine manager (VMM) 232 and a physical network interface adapter or physical NIC 234. It is understood that other configurations with greater or fewer numbers of VMs 231 and/or physical NICs 234 may be possible. Each of the VMs 231 may be configured to exchange information with one or more external devices via the physical NIC 234. Information exchanges may include, without limitation, the transmission and/or reception of data, e.g., in the form of messages or packets. It is understood that the physical NIC 234 includes at least one network interconnecting port 238, or simply port, that generally operates according to some nominal maximum bandwidth. Virtualization permits the sharing of resources of the physical NIC 234, such as the bandwidth of a network interconnecting port, but without requiring the layer 2 virtual switch 223 (FIG. 2B).

A single physical host interface, such as a PCI-e bus, may be shared in a virtual environment according to a SRIOV approach. Each PF and VF may be assigned a unique identifier, e.g., a PCI-e requester ID that allows a management unit to differentiate between different traffic streams, e.g., applying memory and interrupt translations between the PF and VFs. According to the PF and VF, traffic streams may be delivered directly to an appropriate hypervisor parent or child partition, allowing data traffic flows from the PF to VF without affecting other VFs. According to such SRIOV approaches, network traffic may bypass a software switch layer of a hypervisor virtualization stack. The VF, being assigned to a child partition, facilitates network traffic flows directly between the VF and the assigned child partition.

According to the illustrative example, each of the VMs 231 includes a respective VF driver 235*a*, 235*b*, 235*c*, generally 235. The physical NIC 234 may be configured according to virtual functions 236*a*, 236*b*, 236*c*, generally 236, such that each of the VF drivers 235 is in communication with a respective one of the VFs 236. The VFs 236, in turn, may be in communication with a virtual communication device 233 to further facilitate sharing of resources of the physical NIC 234, such as the bandwidth of the network interconnecting port 238. In this example, the virtual communication device performs a virtual bridging function, e.g., a virtual Ethernet bridge and classifier. According to either of the foregoing examples illustrated in FIGS. 2B and 2C, external communications, e.g., in the form of network messages, may be handled according to virtual MAC addresses, e.g., the self-generated MAC addresses of the VMs.

Traditionally, MAC addresses are bound to network hardware and independent of the operating system. Network nodes with multiple network interfaces, such as routers and multilayer switches, utilize a unique MAC address for each NIC in the same network. A traditional MAC address may be stored in a ROM or flash memory space on the NIC or else set in a support chip near the network hardware on a motherboard. Alternatively, or in addition, the MAC address may be placed in a reserved or protected settings of system BIOS. Most operating systems (OS) allow spoofing of a MAC address, in which the OS may temporarily change the MAC address at run time, but it will always return to an OS-independent MAC address set in the hardware. MAC addresses can be virtual. Software may be adapted to allow a single network interface to appear as a larger number of network interfaces, e.g., a dozen network interfaces, each with its own MAC address with an expectation that MAC addresses are unique for a network media (such as a connected Ethernet) at a given point in time.

On a given host, there may be large numbers, e.g., hundreds or more, of virtual functions (VFs) depending on how many VMs are enabled per port. Managing VFs on network interface adapters and understanding the mappings of the VFs to each guest VM is challenging for anyone managing compute hosts in a data center, as each VF has its own self-generated MAC address. The issue gets more complicated as each host system traditionally will have multiple network interface cards, may if not most of which are equipped with multiple ports, e.g., to provide redundancies to applications. There is no easy way today to keep track of the mapping unless a database of mapping is maintained or customized script with various utilities are maintained. Such manual methods of keeping track of associations between network interfaces and virtual machines are error prone, with costly implications should any errors occurring in such mappings.

For applications in which virtualization is utilized on a compute host, it is envisioned that each physical host runs multiple virtual machines, e.g., tens of VMs or more in some instances. A compute host may have one or several, NICs, e.g., a single host having 2-4 Ethernet network interface adapter cards, each card with one or several network interface ports. It is understood that a single compute host may have a large number of virtual functions (VFs) sharing a lesser number of physical network interface adapters, e.g., physical network interface ports. Consider an example compute host configured with two dual-port NICs representing four physical network interface ports. A hypervisor may be utilized to configure multiple VFs per port, e.g., 32 VFs/port. In this configuration, the compute host would have 128 VFs.

$$2\frac{NIC\text{ Cards}}{\text{Host}}\times 2\frac{\text{Physical Ports}}{NIC\text{ Card}}\times 32\frac{VFs}{\text{Physical Port}}=128\frac{VFs}{\text{Host}} \quad \text{(Eq. 1)}$$

A SRIOV approach may be enabled on one or more network interface adapter cards such that the cards may be configured with a number of network virtual functions (VFs), which may then be mapped to a guest virtual machines as virtual network interface devices. In at least some embodiments, the VFs may be created during a boot time of the host processing device—there may be no MAC address by default. The VFs may be associated with and/or otherwise attached to the VMs, which may appear as network interfaces on the VM.

The attached VFs may have a MAC address assigned on its network interface by a virtualization management system. For example, a computer program that runs as a background process, such as libvirtd, a KVM management daemon, may assign a random MAC address to a VF associated with a VM when the VM is initiated, booted up and/or otherwise "spun up" on a host processing system. Heretofore, there was no simple way to identify and/or map assignments of VF on a VM back to a host processing system, e.g., a hypervisor running on the host, without running a cascade of commands at the host. Such commands may have included examination of an XML file of the VM, which attaches the VF to VM, running a command-line-based utility in a Linux-based operating system, such as the "ip link" command, as may be used to display and modify network interfaces, the "Ishw" command providing detailed information on a system's hardware configuration as may be obtained from various files in a/proc directory. Other commands may have include generating and/or running customized scripting, and so on.

Figure 2D:
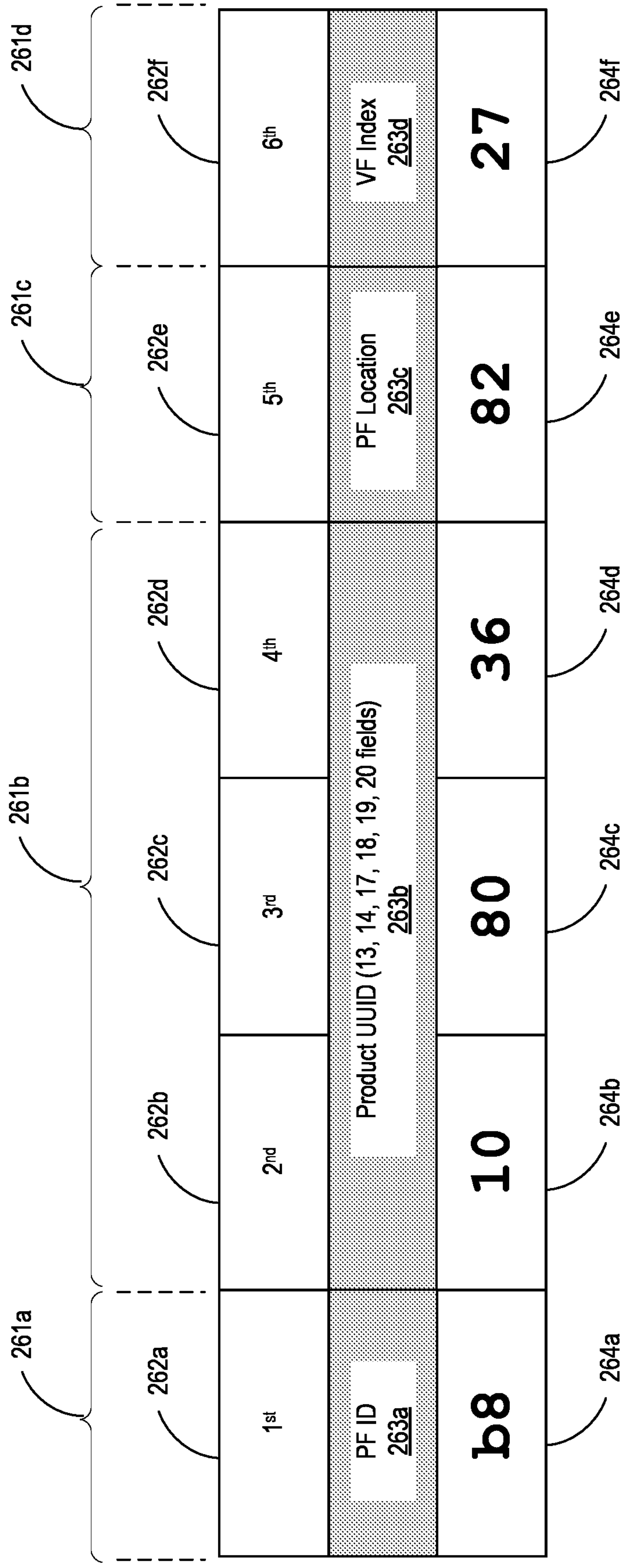
FIG. 2D is a schematic diagram illustrating an example, non-limiting embodiment of a virtual MAC address in accordance with various aspects described herein.

FIG. 2D is a schematic diagram illustrating an example, non-limiting embodiment of a descriptive MAC address 260 in accordance with various aspects described herein. The example descriptive MAC address 260 includes multiple address fields 262*a*, 262*b*, 262*c*, 262*d*, 262*e*, 262*f*, generally 262. According to the illustrative example, each address field 262 includes a 2-octet (16 bit) number 264*a*, 264*b*, 264*c*, 264*d*, 264*e*, 264*f*, generally 264, resulting in an overall 6-octet (48-bit) that may be used to manage data exchanges to and/or from a VM operating within a network environment. Other embodiments may include different sized and/or formatted MAC addresses, such as an 8-octet (64 bit) number. The descriptive MAC address 260 may be obtained by generating, modifying and/or otherwise adapting a MAC addresses to incorporate information that identifies at least one attribute of a physical entity associated with a virtual network interface addressable via the descriptive MAC address 260. In at least some embodiments, the physical entity may include a physical network interface adapter and/or adapter port. Information attributable to the physical entity may include, without limitation, a location of the physical network interface adapter, a manufacturer, a configuration, and the like. Other physical entities may include one or more of a host processor, an equipment rack identifier, a data center identification and so on. Information attributable to such physical entities may include locations, identifiers, configurations, manufacturers, owners, operators, and so on.

In at least some embodiments, the descriptive MAC address 260 includes a first group of address fields 261*a* associated with an identification of a physical entity. According to the illustrative example, the first group of address fields 261*a* includes a 2-octet (16 bit) number 262*a* associated with a physical function (PF) identification 263*a*. The example 2-octet number 264*a* is "b2" which may be obtained from a portion of MAC address of a physical network interface adapter, e.g., the first byte of a "burned in" MAC address of the network interface adapter.

In at least some embodiments, the descriptive MAC address 260 includes a second group of address fields 261*b* providing a locally unique reference number to ensure uniqueness of descriptive MAC addresses 260 within a particular network segment. According to the illustrative example, the second group of address fields 261*b* includes three adjacent 2-octet (16 bit) fields 262*b*, 262*c*, 262*d*. The example 2-octet fields are populated by example 2-octet numbers 264*b*, 264*c*, 264*d*, which are "b2:80:36." In at least some embodiments, the 2-octet numbers 264*b*, 264*c*, 264*d* may be obtained from a product UUID 263*b*. According to the illustrative example, the second group of address fields 261*b* are obtained from fields 13, 14, 17, 18, 19 and 20 of a UUID of the VM. In at least some embodiments, the second group of address fields 261*b* may be obtained from the RFC4122 of the UUID standard, e.g., signifying clock_seq_hi and clock_seq_low, which are unique for each physical hardware (compute host).

In at least some embodiments, the descriptive MAC address 260 includes a third group of address fields 261*c* associated with a location of a physical entity. According to the illustrative example, the third group of address fields 261*c* includes a fifth 2-octet (16 bit) number 262*e* associated with a physical function (PF) location 263*c*. The example 2-octent number 264*e* is "82" indicating the PF is located at slot #8, port 2 of a host expansion bus.

In at least some embodiments, the descriptive MAC address 260 includes a fourth group of address fields 261*d* associated with a reference of a virtual function associated with the physical function, e.g., the physical network interface adapter. It is understood that bandwidth of a single port of the physical network interface adapter may be shared, e.g., by multiple VMs and/or by multiple VFs. According to the illustrative example, the fourth group of address fields 261*d* includes a sixth 2-octet (16 bit) number 262*f* associated with a VF index 263*d*. The example 2-octent number 264*f* is "27" indicating the descriptive MAC address 260 is associated with a 27th VF. It is understood that in at least some configurations, a VM may utilize multiple VFs. For example, the VF index may range from 0 to 127, for a configuration having 128 VFs per PF.

Figure 2E:
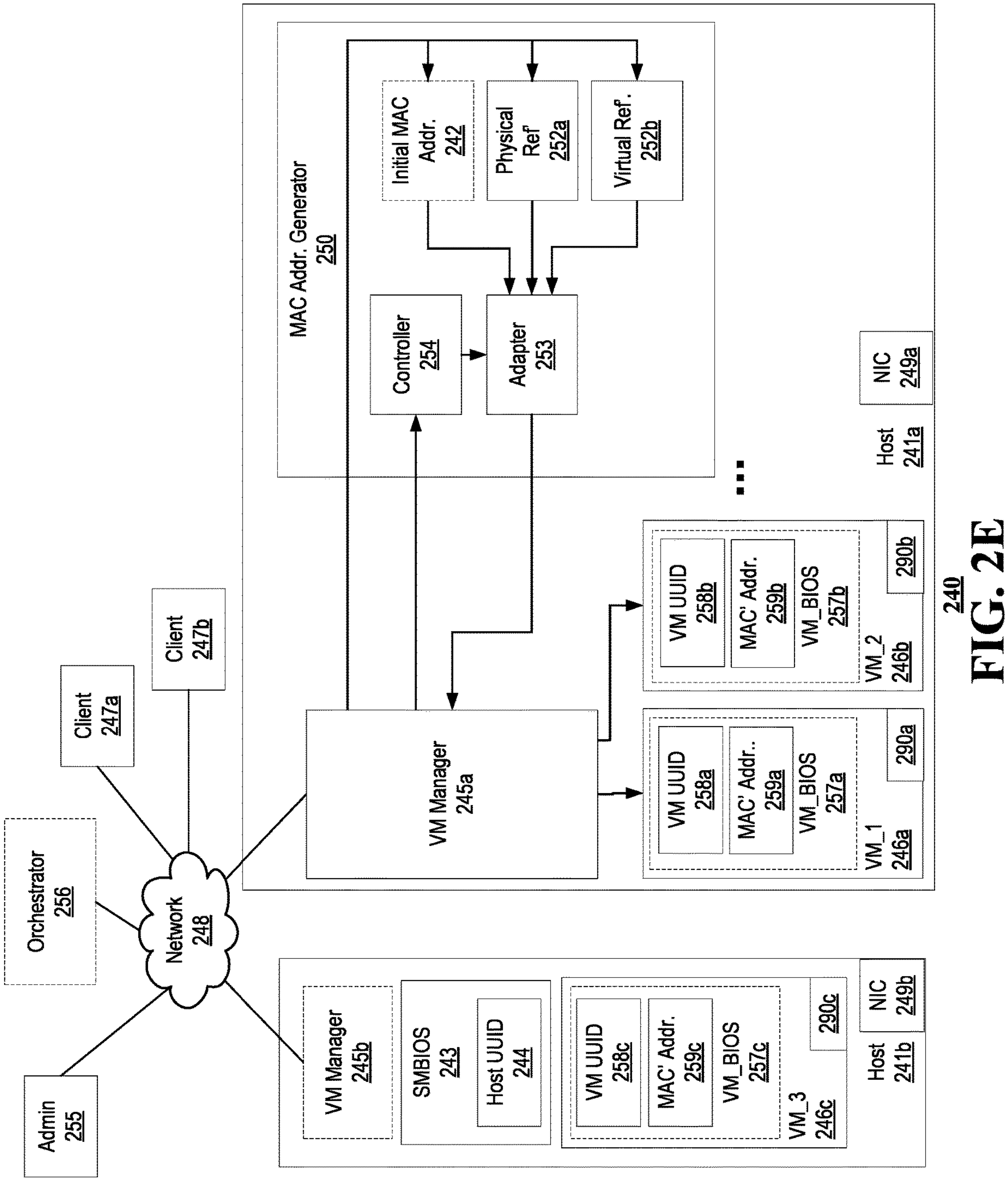
FIG. 2E is a block diagram illustrating an example, non-limiting embodiment of a system that supports virtualization functioning within the communication network of FIG. 1 in accordance with various aspects described herein.

FIG. 2E is a block diagram illustrating an example, non-limiting embodiment of a system 240 that supports virtualization functioning within the communication network of FIG. 1 in accordance with various aspects described herein. The example system includes first and second host processing systems 241*a*, 241*b*, generally hosts 241. Each host processing system 241 includes a respective non-volatile memory, which may include a respective Basic Input/Output System (BIOS), e.g., a system management BIOS (SMBIOS) 243 shown for the host processing system 241*b*. Each SMBIOS 243 may store a respective host identifier 244.

Each host processing system 241 also includes a respective virtual machine manager (VMM), 245*a*, 245*b*, generally 245. In at least some embodiments the VMM 245 includes a software application referred to as a hypervisor. The VMM 245 may be adapted to manage one or more virtual machines (VM) 246*a*, 246*b*, 246*c*, generally 246. Management of the VMs 246 may include one or more of initializing, commissioning, decommissioning, cloning, and/or transferring one or more VMs within the same host processing system 241 and/or among more than one different host processing systems 241. In order to facilitate management of the VMs 246, each VM 246 is confirmed with a respective VM UUID value 258*a*, 258*b*, 258*c*, generally 258, sometimes referred to as a private UUID value 258. According to the illustrative example, each of the VMs 246 may be configured with a respective VM BIOS 257*a*, 257*b*, 257*c*, generally 257. Each respective VM BIOS, in turn, may be adapted to store the respective private UUID value 258.

Alternatively, or in addition, management of the VMs 246 by the VMM 245 may include one or more of virtualizing other resources, such as memory and/or a network interface. By way of example, the VMM 245 may virtualize network interface adapters and/or network interfaces, e.g., a NIC and/or individual ports of a multi-port NIC. One or more of the host processing system 241 may include one or more physical network interface adapters 249*a*, 249*b*, generally 249. In at least some embodiments, the virtualization of a network interface adapter may facilitate sharing of a single physical network interface with one or more virtual network interface adapters 290*a*, 290*b*, 290*c*, generally 290. It is understood that a VM 246 may be configured with one or more virtual network interface adapters 290. Accordingly, the single physical network interface adapter 249 may be shared with multiple virtual network interface adapters 290 of a single VM 246 and/or among virtual interfaces of multiple VMs 246. Without restriction, the sharing of a physical network resources through virtualization may be configured for VMs 246 hosted within the same host processing system 241 and/or with one or more VMs 246 hosted one or more different host processing systems 241.

Host processing systems 241 may include, without limitation, rack-mounted servers, e.g., datacenter servers, desktop servers, laptop computers, tablet devices, mobile communication devices, network elements, and the like. It is envisioned that one or more of the host processing systems 241 may be in communication with one or more communication networks 248. The communication network(s) 248, without limitation, may include one or more of a wide area network, e.g., the Internet, a location area network (LAN), e.g., an Ethernet and/or AppleTalk network, a personal area network, e.g., BlueTooth. Connections between the host processing system 241 and the network 248 may be wired, e.g., using a standard network cable, such as a coaxial cable, optical fiber cable, and twisted pair cables. Alternatively, or in addition, connections between the host processing system 241 and the network 248 may include wireless communication links, e.g., according to one or more of a WiFi protocol link, a BlueTooth protocol link, a mobile cellular link, a nearfield communications link, and the like.

In at least some embodiments, the host processing system 241 may be in communication with one or more client devices 247*a*, 247*b*, generally 247. For example, the client devices 247 may include any combination of desktop workstations, laptop computers, tablet devices, smart phones, and the like. It is understood that in at least some applications, one or more of the client devices 247 may include a machine, such that communications between the host processing system 241 and the client device 247 comply with machine-type communications, e.g., according to an Internet of things (IoT) applications. Machine-type client devices 247 may include, without limitation, home appliances, e.g., home security systems, home entertainment systems, smart devices, such as printers, kitchen appliances, heating-ventilation and air conditioning (HVAC) systems, lighting systems, monitoring systems, e.g., video monitors, door/entry controls, and the like. In at least some embodiments, machine-type client devices 247 may include vehicles, e.g., smart cars, drones, and so on.

It is envisioned that in at least some applications, the system 240 may include an administrative function 255. The administrative function 255 may be adapted to facilitate access to and/or operations of one or more of the host processing systems 241, the VMM 245, the VMs 246, the physical network interface adapters 249 and/or the virtual network interface adapters 290. In at least some embodiments, the administrative function 255 may include an operation and maintenance (O&M) function, e.g., accessible via an O&M terminal and/or application.

In at least some applications, the VMs 246 may be deployed in and/or otherwise utilized within a software defined network (SDN). SDN applications may include an orchestration function 256. The orchestration function 256 may be adapted to facilitate access to and/or operations of one or more of the host processing systems 241, the VMM 245, the VMs 246, the physical network interface adapters 249 and/or the virtual network interface adapters 290. In at least some embodiments, the orchestration function 256 may be configured to run autonomously. Alternatively, or in addition, the orchestration function 256 may be accessible via an SDN O&M terminal and/or application.

A descriptive file and/or template, such as an extensible markup language (XML) file/template may be used to organize information related to and/or a definition a VM and/or other resources, such as physical network interfaces and/or virtual network interfaces. Such information may include a host name of the VM, and/or other requirements, such as a processing, i.e., CPU, requirement, a memory requirement, a required number and/or type of communication, i.e., network, interfaces and so on. In at least some embodiments, the information may include a location, configuration, supplier, type, and/or other information related to the physical network interfaces. By way of example and without limitation, network type information may identify one or more of an available number and/or type of network interface ports and/or bandwidth capabilities associated with such ports. An XML template may also include one or more UUID fields. For example, if the UUID field is left empty, then a system, such as a hypervisor, may automatically generate a UUID, e.g., randomly. In at least some embodiments, rather than following a script of an XML file to generate UUID randomly, the UUID generation may be configured to restrict generated UUIDs to a subset of UUIDs of a host and/or parent hypervisor. For example, the script may obtain a UUID of the physical host as may be obtained from nonvolatile memory (SMBIOS) attached to the host/parent system. For example, a host UUID may be arranged according to five fields, of which the fifth field is a randomly generated field. In generating a modified UUID of the VM, a subset of the host UUID, e.g., four of the five fields, may be taken from host UUID. A randomly generated field may then be added to the extracted four fields to yield a modified UUID having five fields that uniquely identifies the VM, as well as the VM's association to its host or parent.

Alternatively, or in addition, the XML template may include one or more MAC address fields. For example, if the MAC address field is left empty and other otherwise nonexistent as may be the case for a VM 246 prior to initiation, then a system, such as a hypervisor, may automatically generate a MAC address, e.g., randomly. In at least some embodiments, rather than following a script of an XML file to generate the MAC address randomly, the host processing system 241 includes a MAC address generator 250. The MAC address generator 250 may be configured to generate, modify and/or adapt a MAC address, e.g., according to a combination of one or more of the various techniques disclosed herein.

In at least some embodiments, the MAC address generator 250 includes a physical reference module 252*a* and a virtual reference module 252*b*, an adapter module 253 and a controller module 254. The physical reference module 252 may be configured to identify, determine, receive and/or otherwise obtain information related to a physical realm of a virtualized system. Physical reference information may include, without limitation, one or more of an identity, physical location, type, owner, of a physical device, such as the host processing system 241 and/or the physical network interface adapters 249. In at least some embodiments, the physical reference information may include a configuration, type and/or location of the physical network interface adapters 249. Location information may include one or more of geographical information, association information, e.g., an association of a physical network interface adapter 249 with a particular host processing system 241, and/or configuration information, e.g., identifying a particular host expansion slot identity and/or location, and/or port of the physical network interface adapter 249.

The virtual reference module 252*b* may be configured to identify, determine, receive and/or otherwise obtain information related to a virtual realm of a virtualized system. Virtual reference information may include, without limitation, one or more of an identity, UUID, type, owner, user of a virtual device, such as the VM 246 and/or the virtual network interface adapters 290. In at least some embodiments, the virtual reference information may include a VF index, association and/or type of virtual network interface adapter 290. Virtual information may include associations between VMs 246 and host processing systems 241, between VMs and physical network interface adapters, associations between VFs and PFs, and so on. In at least some embodiments, the MAC address generator 250 includes an initial VM MAC address module 242. This module may be adapted to generate and/or otherwise identify an initial MAC address assigned to a VM 246, e.g., upon initiation of the VM. In at least some embodiments, the initial MAC address may be obtained according to a random process, e.g., a random MAC address that may conform to a MAC address standard, e.g., having six groups of two eight-bit octets, with at least some segments of the MAC address including random arrangements of digits.

The example the MAC address generator 250 includes an adapter module 253 in communication with one or more of the physical reference module 252*a*, the virtual reference module 252*b* and the initial VM MAC address module 242. The adapter module 253 may be in further communication with the controller module 254, such that the adapter module 253 operates under control of the controller module 254. In at least some embodiments, the adapter module 253 generates a descriptive MAC address of a virtual network interface adapter 290. For example, the descriptive MAC address may be generated by obtaining information from one or more of the physical reference module 252*a* and/or the virtual reference module 252*b* and generating the descriptive MAC address based at least in part on obtained information. The descriptive MAC address may include a combination, e.g., a concatenation, of information obtained from one or more of the reference modules 252*a*, 252*b*.

Alternatively, or in addition, the adapter module 253 generates a descriptive MAC address of a virtual network interface adapter 290 by adapting and/or otherwise modifying or adjusting a predetermined MAC address of the virtual network interface adapter 290. For example, the descriptive MAC address may be generated by obtaining information from the initial VM MAC address module 242 and from one or more of the physical reference module 252*a* and/or the virtual reference module 252*b*. The initial VM MAC address module 242 may provide at least a portion of and/or up to an entirety of a predetermined MAC address of the virtual network interface adapter 290, e.g., including one to six of the example address fields disclosed in reference to FIG. 2D. The adapter module 253 may include, combine and/or replace information from the predetermined MAC address with information obtained from one or more of the physical reference module 252*a* and/or the virtual reference module 252*b*. For example, the initial VM MAC address module 242 may provide a randomly generated MAC address obtained in response to generation of a VM 246. The physical reference module 252*a* may provide information identifying a physical location of a physical network interface adapter associated with a virtual network interface adapter 290 of the VM 246. The adapter module 253 may replace one or more address fields of the predetermined MAC address with information identifying the physical location of the physical network module obtained from the physical reference module 252*a*, such as an expansion slot number and/or port number of the physical network interface adapter. Alternatively, or in addition, the adapter module 253 may replace one or more other address fields of the predetermined MAC address with information identifying the VM and/or a VF obtained from the virtual reference module 252*b*, such as a UUID of the VM and/or a reference or index number of the VF.

In at least some embodiments, the VM 246 are adapted to store the descriptive MAC address 259*a*, 259*b*, 259*c*, generally 259. According to the illustrative example, the descriptive MAC addresses 259 may be stored in a VM BIOS 257. The VM manager 245 may be in communication with one or more of the controller module 254 and/or the adapter module 253. The VM manager 245 may initiate generation, modification and/or adaptation of a MAC address, to obtain a descriptive MAC address. In at least some embodiments, the descriptive MAC address includes a location of an associated physical network interface allowing such physical location information to be readily accessible within a virtual environment, e.g., from the VM 246, without requiring assistance of the VM manager 245 and/or without reference to externally generated and/or maintained association tables. In at least some embodiments, the descriptive MAC address includes the location of an associated physical network interface in human readable format, e.g., including an expansion bus slot number and/or port number as hexadecimal entries of address fields of the descriptive MAC address.

In at least some embodiments, the MAC address generator 250 may be configured to incorporate descriptive information related to one or more of a physical configuration, e.g., of a network interface adapter, a virtual configuration, e.g., of a virtual network interface adapter, and/or an association between physical and virtual resources. For example, the MAC address generator 250 may obtain a MAC address of a virtual network interface adapter 290 of a VM 246 as may be obtained from nonvolatile memory (SMBIOS) attached to the host/parent system. Alternatively, or in addition, the MAC address generator 250 may obtain a MAC address of a physical network interface adapter 249 of a host processing system 241 as may be obtained from nonvolatile memory (SMBIOS) attached to the host/parent system. In at least some embodiments, the MAC address generator 250 may obtain other information, such as configuration of a physical network interface adapter 249, e.g., a bus location and/or expansion slot of an expansion bus of the host processing system 241. Still further, it is envisioned that in at least some embodiments, the MAC address generator 250 may obtain association information, such as associations between the physical network interface adapter 249 and a VM 246, a number of virtual functions (VFs) of a single root input/output virtualization (SRIOV) environment, an association of VFs to one or more physical functions (PFs) as may be obtained from nonvolatile memory (SMBIOS) attached to the host/parent system. For example, a virtual MAC address may be arranged according to six fields, of which at least one of the fields provides location information of the physical network interface adapter.

Such UUID generation procedures and/or MAC address generation, adaptation and/or modification procedures may be employed at a time of creation of a VM, e.g., responsive to a VM creation command and/or event. Alternatively, or in addition, the same or similar processes may be applied when an existing VM is migrated to another host. For example, upon a detection of a command to migrate and/or a migration event, the same or similar process may be repeated. Namely, the UUID of the target host/parent may be obtained, e.g., via SMBIOS of the target host/parent. A subset of fields of the target UUID may be extracted, e.g., the first four fields, and combined with the previously generated fifth field to obtain a newly modified UUID for the migrated VM. In this manner, the fifth field may be used to identify a particular VM, while the first four fields may be used to identify a current host/parent. Alternatively, or in addition, a randomly generated MAC address of a VM 246 may be obtained coincident with initiation of the VM 246 and/or at some time after initiation of the VM 246.

It is further envisioned that the MAC address generation, adaptation and/or modification process may be adapted to incorporate other information into a descriptive MAC address. The MAC address generator 250 may be configured to obtain descriptive information, such as one or more of a portion of a MAC address of the physical network interface adapter, at least a portion of the UUID of the VM 246, a location of the physical network interface adapter, an index of a VF, and so on, and to incorporate some or all of such information into a descriptive MAC address 259*a*, 259*b*, 259*c*, generally 259, of the virtual network interface adapter 290. In at least some embodiments, the descriptive MAC addresses 259 may be stored. For example, a descriptive MAC address 259 may be stored in association with a respective VM 246, such as in VM BIOS 257.

In some embodiments, e.g., in a software defined network, an orchestration tool may be configured with an option to track migration of VMs and/or associations of VMs to physical network interface adapters. In some embodiments, a history of MV migrations and/or transitions and/or associations of VMs to physical network interface adapters may be generated. For example, when a VM UUID generation process is performed, the resulting modified UUID may be entered into a record. The recorded entry may include a temporal reference, such as a sequence number, time and/or date, and so on. As the VM UUID generation process may be repeated, e.g., during a migration and/or transition of an existing VM to another host/parent, the resulting modified UUID of the VM may be entered as a modified record and/or as a new record. Such records may be used to identify a VM's current location as well as a historical records of any migrations/transfers along with their corresponding dates and times. Such records may be generated and/or updated without having to separately reference a VM to host mapping and/or without having to separately probe the host processing system hardware.

The possibility of using modified UUIDs to track historical migration, and/or time of migration, may be used by other system management and/or virtualization tools, e.g., to facility recovery of a previous host. It is envisioned that a hypervisor may retain information, record of movement, e.g., including instructions and/or logic to note and/or use migration information that may facilitate future hypervisor operation, e.g., decisions. For example, a hypervisor may be adapted to retain a record that VM_9 and VM_10, which previously existed on Host_1, have since been migrated to Host_2. Such records may include a time stamp that may be used to identify when VM_9 and VM_10 started on Host_2. The hypervisor may not know where VM_9 and VM_10 came from, but it knows that VMs were moved, where they were moved to and at what time the move occurred.

Figure 2F:
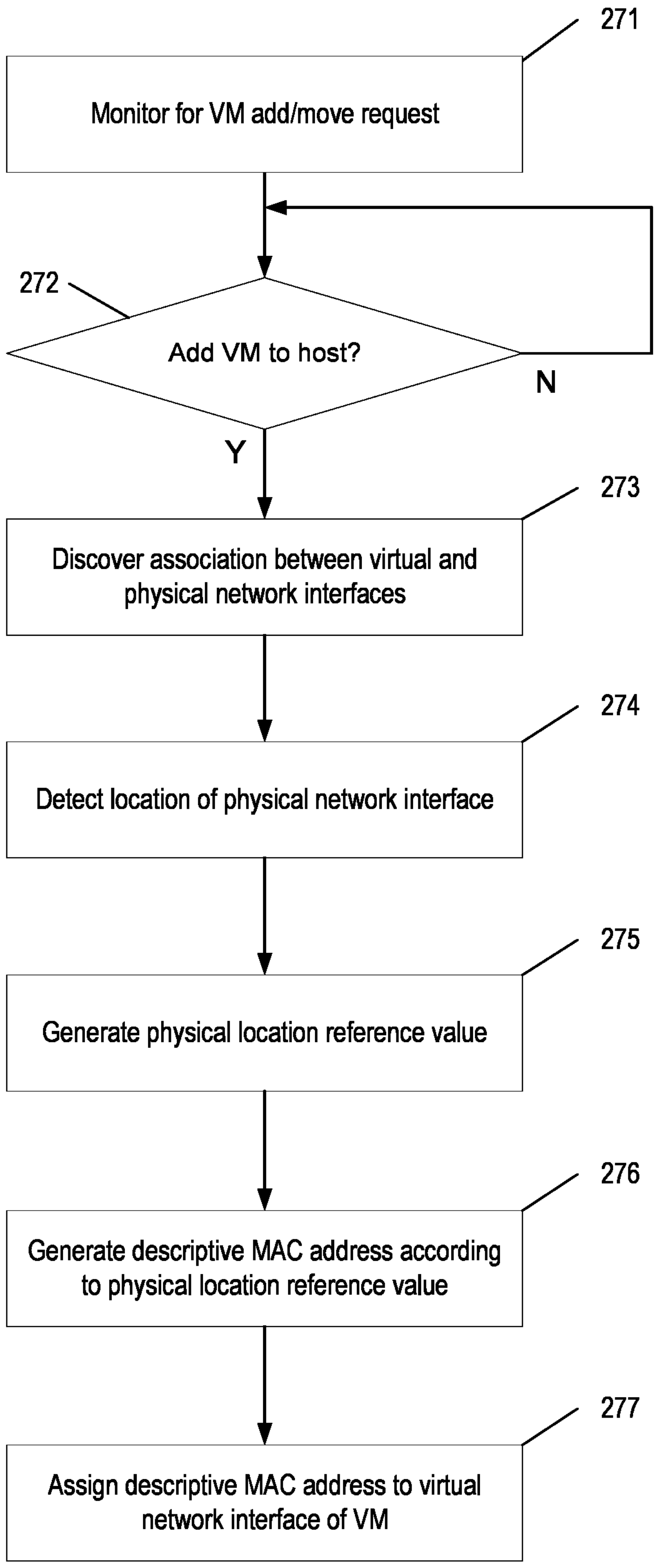
FIG. 2F depicts an illustrative embodiment of a network interface adapter virtualization process in accordance with various aspects described herein.

FIG. 2F depicts an illustrative embodiment of a MAC address generation process 270 in accordance with various aspects described herein. The MAC address generation process 270 includes monitoring at 271 for operation and/or maintenance (O&M) activity related to virtual machine life-cycle events. Life-cycle events may include, without limitation, creation of a new virtual machine, transfer of an existing virtual machine from one physical host to another, cloning of an existing virtual machine, and/or termination of an existing virtual machine. At least some of the life-cycle events, e.g., virtual machine creation, may involve instantiation of a guest virtual machine upon a particular host processor.

A determination may be made at 272 as to whether a monitored O&M activity relates to a life-cycle event adapted to create a new instance of a virtual machine upon a target host processor. To the extent the monitored O&M activity does not relate to creation of a new instance, the MAC address generation process 270 may continue to monitor O&M activity at 253. However, to the extent that a determination is made at 272 that a monitored O&M activity relates to a life-cycle event adapted to create a new instance of the virtual machine upon the host processor, the MAC address generation process 270 may proceed to discover at 273, an association between virtual and physical entitles, such as an association between a virtual network interface and a physical network interface, or an association between a VM and a physical network interface. An allocation and/or association of one or more physical resources, such as network interface adapters and/or network interface adapter ports and a virtual entity. The virtual entity may include, without limitation a VM, a virtual network interface, a virtual function (VF). The associations may be determined prior to generation of a VM and stored in a retrievable format, such as a data file that may be accessible by other devices, such as a VMM 245 and/or the MAC address generator 250 (FIG. 2E). Alternatively, or in addition, the associations may be determined during initiation of a VM.

In at least some embodiments, the MAC address generation process 270 identifies, detects and/or otherwise determines a physical location of a physical network interface adapter at 274. The location information may include one or more of a geographic location, an identity of a physical data center, an identifier of a physical host, a host expansion bus location, e.g., a PCI-e slot number and/or a network interface adapter port identifier, e.g., port number. The location information may be obtained from configuration records as may be determined during a system configuration and/or reconfiguration process. Such records may be stored in a retrievable format, such as a data file that may be accessible by other devices, such as the VMM 245 and/or the MAC address generator 250 (FIG. 2E). Alternatively, or in addition, the information may be entered manually, e.g., from the administrative function 255, e.g., via an O&M terminal and/or application. In at least some embodiments, the location of the physical network interface may be determined by an inspection of hardware resources as may be determined visually and/or via software, e.g., an operating system software examination of system resources and/or resource configurations.

According to the MAC address generation process 270, a physical reference value is generated at 275 for the location of the physical network interface adapter to be associated with a VM, a virtual network interface and/or a VF. The physical reference value may be configured for incorporation into one or more address fields of a MAC address, e.g., as a pair of hexadecimal values suitable for incorporation into field five of a typical MAC address. One of the hexadecimal values, e.g., a first value, may encode a first number from 0-15, which is indicative of a host expansion bus location, e.g., a slot number. Another one of the hexadecimal values, e.g., a second value, may encode a second number from 0-15, which is indicative of a port number of a multiport network interface adapter. For example, the physical reference value may be a two-octet value "82" in hexadecimal, representing PCI-e slot 8, port 2. In at least some embodiments, the physical reference value may be easily interpretable by a human being, e.g., as numbers that directly correlate to a physical location. Alternatively, or in addition, the physical reference value may be encoded and/or otherwise presented in a format that may be interpretable by a machine, such as the VMM 245 (FIG. 2E).

Further according to the MAC address generation process 270, at least a portion of the physical reference value may be incorporated into and/or otherwise combined with other values to obtain a descriptive MAC address at 276. For example, a randomly generated MAC address determined during initiation of a VM may be adapted and/or modified by replacing one or more address fields with the physical reference value. By way of example, the two-octet value "82" referred to above may directly substituted with the random address fifth field of a six-field random MAC address to obtain a descriptive MAC address. Accordingly, inspection of the fifth field provides an immediate indication that the virtual network interface associated with a second port of the physical network interface adapter at PCI-e slot number 8 of the host processor. It is understood that in at least some embodiments, one or more other fields of a randomly generated MAC address may be adapted and/or modified by replacing those field(s) with interpretive values that may identify other features, such as a physical host identifier, a virtual machine reference, a VF index, and the like.

In at least some embodiments, at least a portion of a modified or descriptive MAC address may include a value that ensures no two descriptive MAC addresses are the same at least within a particular network segment, e.g., a LAN and/or an enterprise network. For example, a random value may be incorporated in one or more address fields of the descriptive MAC address to enforce and/or otherwise ensure uniqueness of the descriptive MAC address within the particular network segment.

Although the foregoing examples refer to modifying and/or adapting an existing, predetermined and/or otherwise provisioned MAC address to obtain the descriptive MAC address it is understood that the process may be applied during generation of a MAC address. For example, instead of initiating a random MAC address, the VMM 245 alone or in combination with the MAC address generator 250 (FIG. 2E) may determine one or more descriptive fields, such as the physical reference value prior to and/or at a time of generation of a MAC address in association with a VM 246. Accordingly, one or more address fields of the MAC address may be initiated with descriptive information, such as the physical reference value and/or other features, such as a physical host identifier, a virtual machine reference, a VF index, and the like.

A MAC address may be assigned at 277 to the guest virtual machine. In at least some embodiments, assignment of the MAC address to a VM may be identified prior to adaptation and/or modification of a MAC address to obtain a descriptive MAC address. Alternatively, or in addition, a MAC address may be assigned to a VM substantially coincident with initiation of the VM on a particular host and/or transfer of the VM to another host. In at least some embodiments, the MAC address may be assigned to an existing VM, e.g., to replace a MAC address to incorporate descriptive information relating to an association of a physical entity to a virtual entity within a virtual environment. Such replacement of a MAC address may be performed in association with O&M activity, e.g., replacement of failed hardware, realignment of resources, and so on.

Figure 2G:
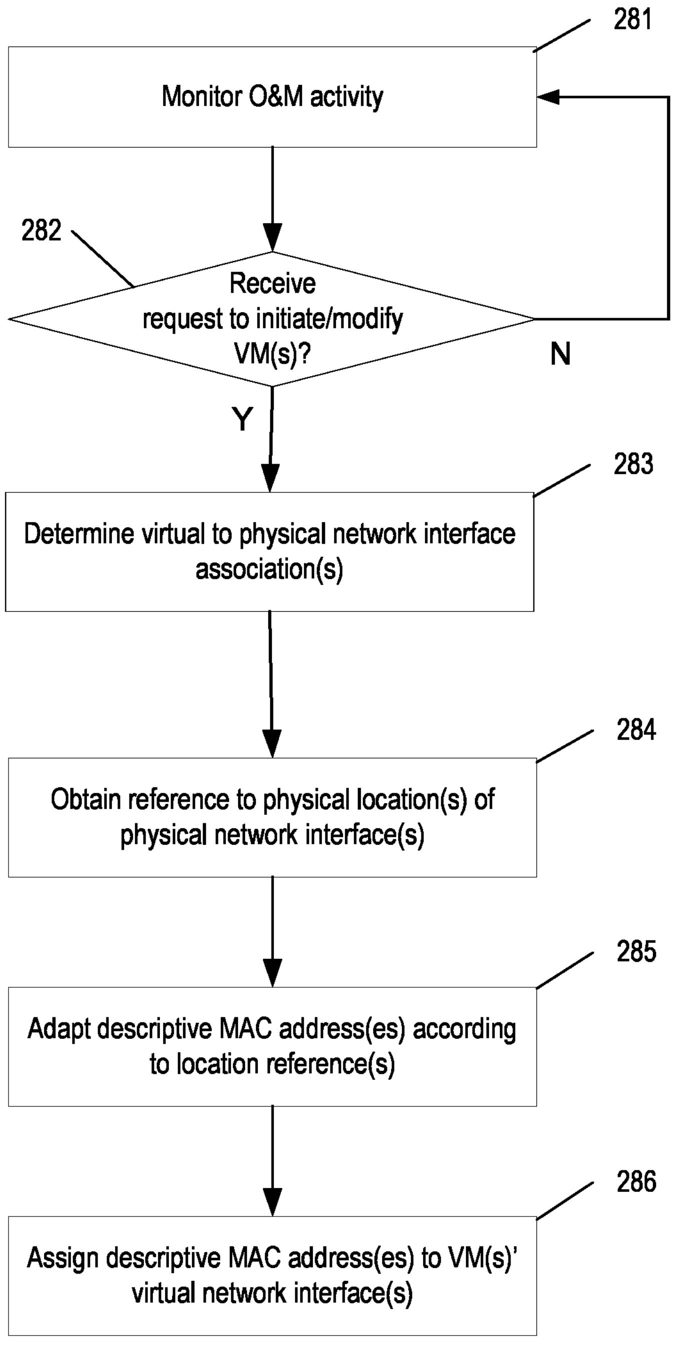
FIG. 2G depicts an illustrative embodiment of another network interface adapter virtualization process in accordance with various aspects described herein.

FIG. 2G depicts an illustrative embodiment of a MAC address adaptation process 280 in accordance with various aspects described herein. The MAC address adaptation process 280 includes monitoring at 281 for O&M activity related to virtual machines. O&M activity may include a number of commands, requests and/or messages that may relate to one or more guest virtual machines, processes running on guest virtual machines, host processors hosting guest virtual machines, and so on. For example, monitored O&M activity may relate to a request for memory and/or processor utilization of one or more gest virtual machines. Alternatively, or in addition, the monitored O&M activity may relate to a request for running processes, e.g., to determine load balancing, and the like. In at least some embodiments, the monitored O&M activity includes initiating one or more VMs. Initiation of a VN may include any combination of creation of a new VM on a target host processor, migration of an existing VM from a legacy target host processor to a new target host processor, cloning of an existing VM on one target host processor to one or more new VMs on the same and/or different target host processors, and the like.

A determination may be made at 282 as to whether a monitored O&M activity relates to any request that may require initiation of a VM and/or modification of a VM configuration. To the extent the monitored O&M activity does not relate to a request that may require initiation and/or modification of a VM, the MAC address adaptation process 280 may continue to monitor O&M activity at 281. However, to the extent that a determination is made at 282 that a monitored O&M activity relates to a request that may require initiation of a VM and/or modification of a VM, the MAC address adaptation process 280 may proceed to determine at 283, a virtual-to-physical network interface association. For example, a virtual-to-physical network interface association may include an association of a VM, a virtual network interface and/or a VF, e.g., a VF index, to a physical device, such as a physical network interface adapter and/or network port.

According to the MAC address adaptation process 280, a reference to a physical location of the physical network interface adapter may be obtained at 284. The location information may be obtained by way of any suitable manner, including the various examples disclosed herein. For example, the location information may be obtained from a predetermined association as may be provided in a retrievable configuration file or record. Alternatively, or in addition, the location information may be obtained from O&M records and/or from an inspection of system resources as may be performed using software commands, e.g., operating system commands, manual entry, and so on.

According to the example MAC address adaptation process 280, a MAC address may be adapted according to location reference at 285. In at least some embodiments, adaptation of the MAC address incorporates a location reference of a physical network interface adapter, such as the example host expansion bus location and/or adapter port. The adapted MAC address may be referred to as a descriptive MAC address in that it includes, incorporates and/or otherwise encodes physical location information related to a virtual network interface associated with the descriptive MAC address. The adapted, e.g., descriptive, MAC address may be associated with a VM and/or a virtual network interface adapter interface of a VM at 286. Beneficially, the descriptive MAC address may be observable from within an operating system of the virtual machine. To the extent the descriptive MAC address incorporates physical information, such as a location of an associated physical network interface adapter and/or adapter port, the physical location information may be determinable and/or otherwise accessible from a virtual environment of the VM. Such information may be useful in any diagnostic activity as may occur responsive to performance issues observed from within the virtual environment. Quick identification of a physical asset, as may result from using the techniques disclosed herein, may facilitate troubleshooting activities.

In at least some embodiments, at least some portions of the example MAC address adaptation process 280 may be repeated periodically, e.g., according to a predetermined schedule. Consider an O&M process that periodically requests one or more of identities and/or status of guest virtual machines and/or host processors. Such requests may be made according to a regular schedule, e.g., daily, hourly, according to predetermined busy hours, and so on. The MAC address adaptation process 280 may be run according to the schedule to obtain an updated record of results. The results may be stored according to their implementation sequence and/or time to obtain a corresponding historical record.

Alternatively, or in addition, at least some portions of the example MAC address adaptation process 280 may be performed and/or repeated, e.g., according to an event. Events, without limitation, may be based on a monitoring of one or more of parameters, e.g., system parameters, such as memory utilization, CPU utilization, communication activity, disk access and the like. Consider an O&M process that requests one or more of identities and/or status of guest virtual machines and/or host processors responsive to a monitored system parameter, such as a memory and/or CPU utilization crossing a predetermined threshold. For example, when CPU utilization exceeds a high threshold value, e.g., 90% utilization, the O&M may request a status of the virtual machine activity and correlate such activity with the corresponding host processors. The results may be used to instantiate new virtual machines, e.g., by cloning existing virtual machines on the same and/or different host processors. Alternatively, or in addition, the results may be used to redistribute virtual machines among available host processors, e.g., to manage utilization within a performance goal.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In at least some embodiments, the descriptive MAC address may be used to facilitate identifying underlying physical and/or logical devices on a host. Beneficially, the descriptive MAC address may permit such identifications from a perspective of the guest VM, e.g., from within an operating system of the VM. It is envisioned that the descriptive MAC addresses may be used for other reasons, e.g., to generate mapping of VFs to PFs, to facilitate balancing VFs, e.g., across NUMA nodes, to reduce "hot spots," e.g., in which more VFs may be bound to one NUMA node, and/or to enhance security, e.g., by facilitating identification of a misconfigured and/or rogue VM from inspection of the fields of the descriptive MAC address. At least some of the address fields of the descriptive MAC address relate to identifiable values that may fall within expected ranges. Any field containing a value outside of such an expected value and/or range may be an indication of an error or rogue VM.

Accordingly, the descriptive MAC addresses may facilitate troubleshooting system issues quickly, underlying physical and logical devices may be identified on a given host from a perspective of the guest virtual machine. It is understood that tools may be quickly built to generate mappings according to one or more address fields of the descriptive MAC addresses. For example, inspection of the descriptive MAC addresses may be used to determine a mapping of VFs to PFs and/or to identify usage of VFs. Such VF usage information may be useful to facilitate a balancing of the VFs across NUMA nodes to improve performance. More generally, the descriptive MAC addresses may be used to reduce hot spots where more VFs are bound to one NUMA node.

Figure 3:
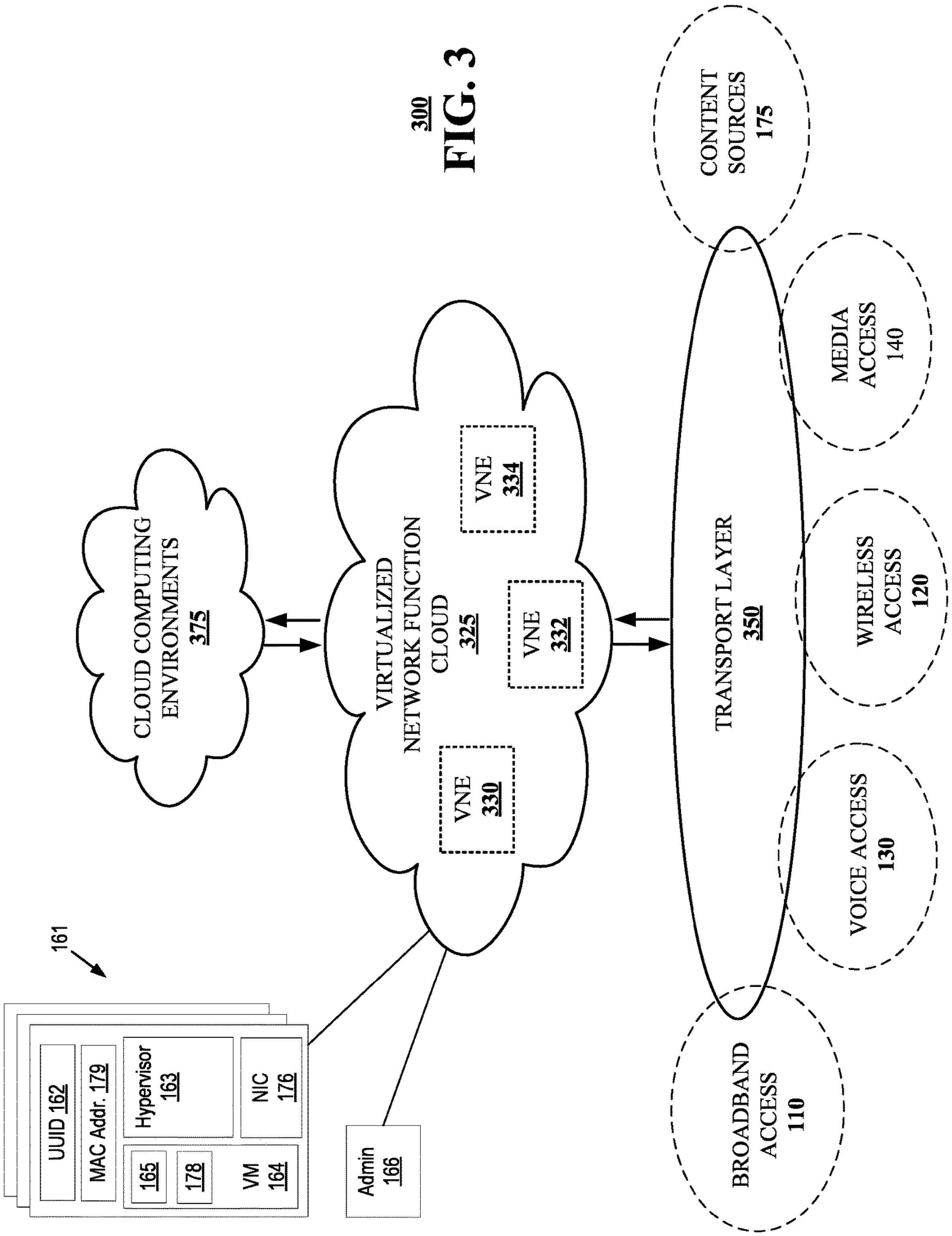
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of the system 240, and the processes 270, 280 presented in FIGS. 1, 2A, 2B, 2C, 2D, 2E, 2F, 2G and 3. For example, the virtualized communication network 300 can facilitate in whole or in part the determination of a physical location reference of a physical network interface and the generation of a descriptive MAC address that incorporates the physical location reference according to an association between the virtual network interface and the physical network interface. The virtual MAC address is further associated with the virtual network interface of a VM, such that the physical location of the physical network interface is identifiable from within an environment of the VM via the descriptive MAC address.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These VNEs 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
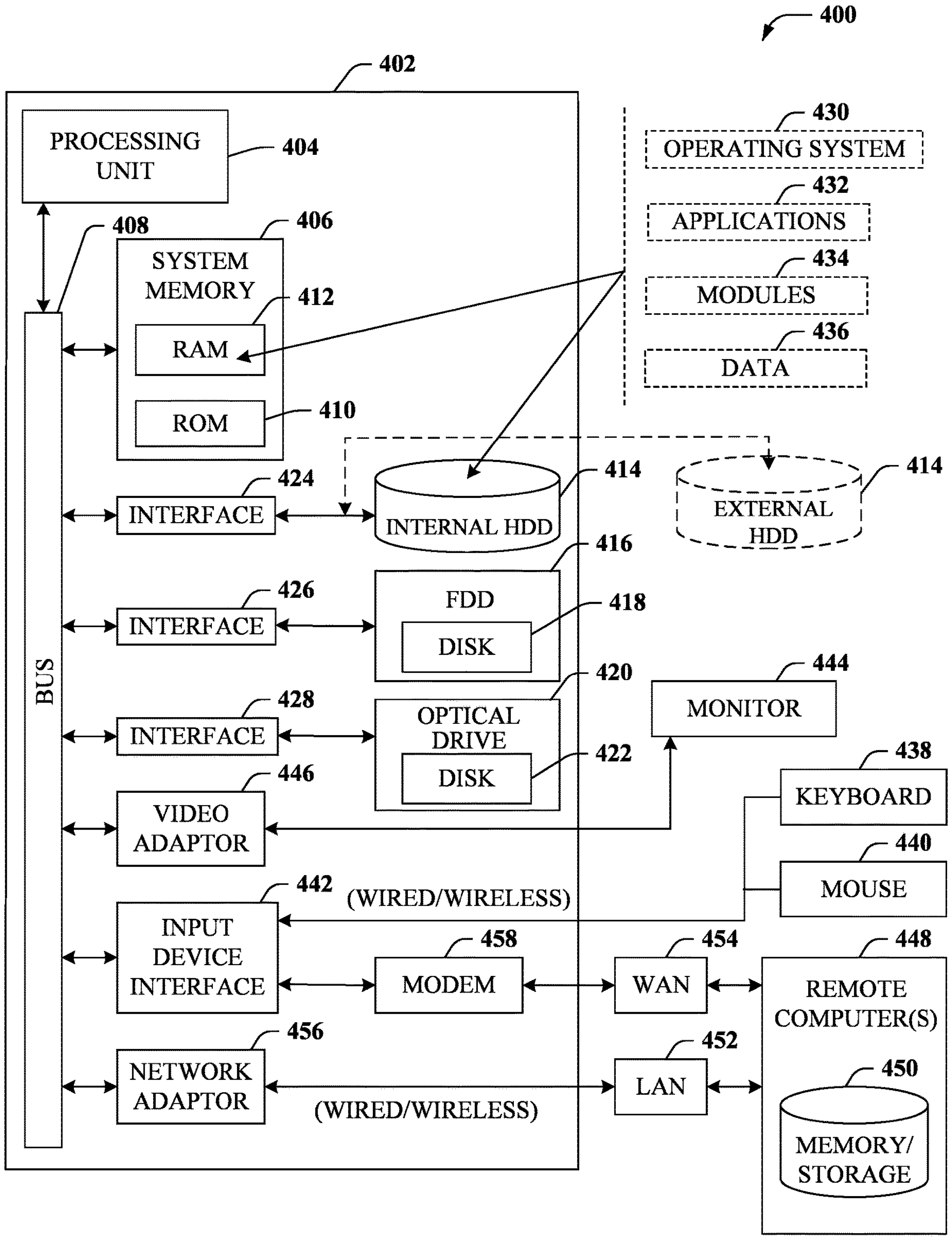
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part the determination of a physical location reference of a physical network interface and the generation of a descriptive MAC address that incorporates the physical location reference according to an association between the virtual network interface and the physical network interface. The virtual MAC address is further associated with the virtual network interface of a VM, such that the physical location of the physical network interface is identifiable from within an environment of the VM via the descriptive MAC address.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The internal HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
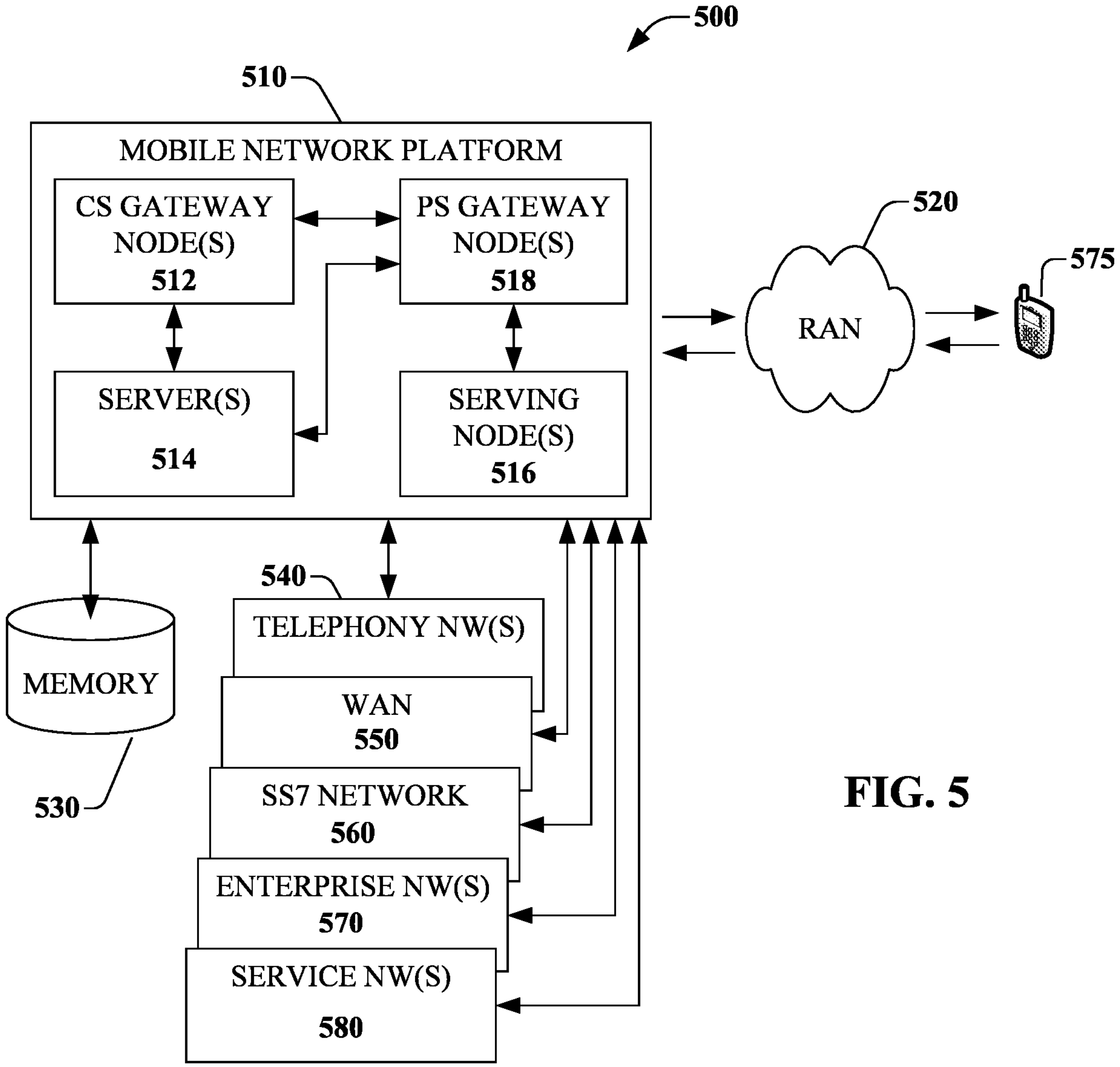
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the mobile network platform 510 can facilitate in whole or in part determination of a physical location reference of a physical network interface and the generation of a descriptive MAC address that incorporates the physical location reference according to an association between the virtual network interface and the physical network interface. The virtual MAC address is further associated with the virtual network interface of a VM, such that the physical location of the physical network interface is identifiable from within an environment of the VM via the descriptive MAC address. In one or more embodiments, the mobile network platform 510 can generate and receive signals transmitted and received by base stations or access points such as base station or access point 122. Generally, the mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, the mobile network platform 510 can be included in telecommunications carrier networks and can be considered carrier-side components as discussed elsewhere herein. The mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through the mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to the mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of the mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of the mobile network platform 510. Other operational information can comprise provisioning information of mobile devices served through the mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
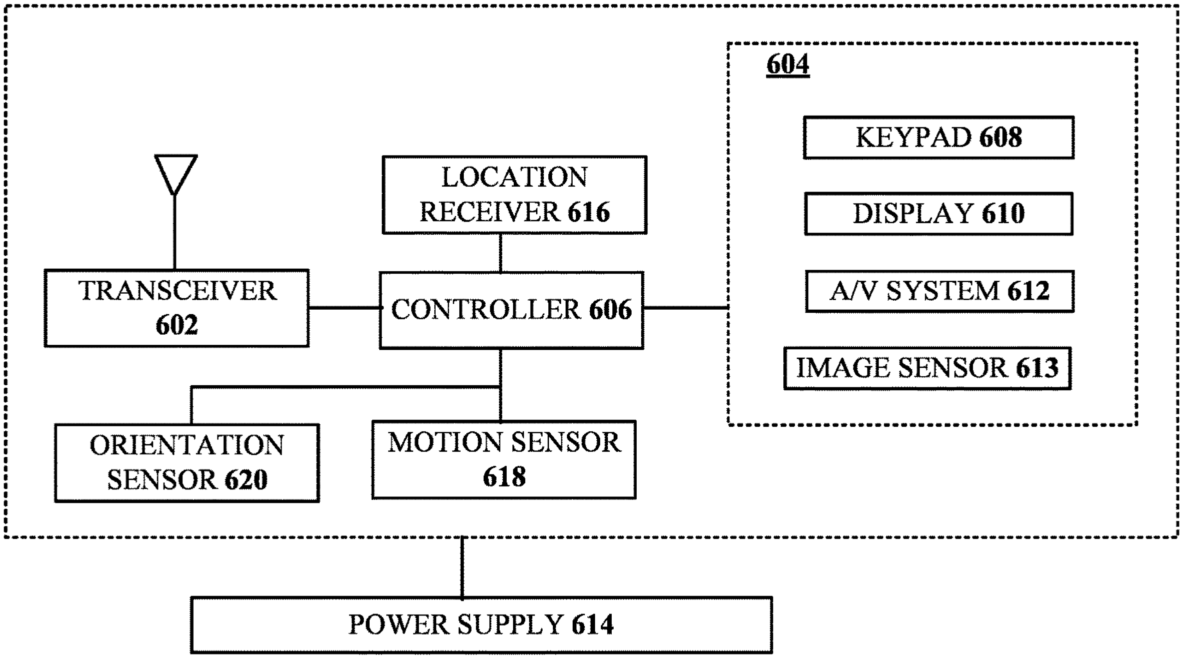
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the communication device 600 can facilitate in whole or in part determination of a physical location reference of a physical network interface and the generation of a descriptive MAC address that incorporates the physical location reference according to an association between the virtual network interface and the physical network interface. The virtual MAC address is further associated with the virtual network interface of a VM, such that the physical location of the physical network interface is identifiable from within an environment of the VM via the descriptive MAC address.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

detecting, by a processing system including a processor, a request to initiate a virtual machine on a physical host processing system, wherein the physical host processing system comprises a physical network interface and wherein the virtual machine comprises a virtual network interface;

discovering, by the processing system, an association between the virtual network interface and the physical network interface;

detecting, by the processing system, a physical location of the physical network interface;

generating, by the processing system, a physical location reference to the physical location of the physical network interface;

generating, by the processing system, a descriptive media access control (MAC) address, wherein the descriptive MAC address incorporates the physical location reference, wherein the generating the descriptive MAC address comprises:

detecting, by the processing system, a provisioned MAC address of the virtual machine, wherein the provisioned MAC address comprises a first plurality of address segments;

generating, by the processing system, a first group of modified address segments comprising the physical location reference; and replacing, by the processing system, a first group of the first plurality of address segments with the first group of modified address segments; and assigning, by the processing system, the descriptive MAC address to the virtual network interface of the virtual machine, the physical location of the physical network interface being identifiable from within an environment of the virtual machine via the descriptive MAC address.

2. The method of claim 1, wherein the provisioned MAC address comprises a random MAC address assigned to the virtual machine responsive to an initiation of the virtual machine.

3. The method of claim 1, wherein the generating the descriptive MAC address further comprises:

generating, by the processing system, the descriptive MAC address prior to an initiation of the virtual machine on the physical host processing system.

4. The method of claim 1, wherein the generating the descriptive MAC address further comprises:

identifying, by the processing system, a random value, wherein the descriptive MAC address further comprises a second plurality of address segments; and incorporating, by the processing system, the random value into a first group of address segments of the second plurality of address segments.

5. The method of claim 1, wherein the generating the descriptive MAC address further comprises:

identifying, by the processing system, a prescribed MAC address of the physical network interface, wherein the prescribed MAC address comprises a second plurality of address segments and wherein the descriptive MAC address further comprises a third plurality of address segments;

extracting, by the processing system, a first group of address segments from the second plurality of address segments; and incorporating, by the processing system, the first group of address segments from the second plurality of address segments into a fourth group of address segments of the third plurality of address segments.

6. The method of claim 1, wherein the descriptive MAC address conforms to a standard format comprising six address segments, each address segment comprising one eight-bit octets.

7. The method of claim 1, wherein the physical host processing system is configured to manage operation of the virtual machine according to single root input/output virtualization (SRIOV) configured to facilitate sharing of the physical network interface among a plurality of virtual machines comprising the virtual machine, wherein a plurality of virtual functions is associated with a physical function, and wherein the physical function is associated with the physical network interface, the plurality of virtual functions facilitating independent network data exchanges for each virtual machine of the plurality of virtual machines.

8. The method of claim 7, further comprising:

associating, by the processing system, a respective index value with each virtual function of the plurality of virtual functions, wherein the descriptive MAC address further comprises a second plurality of address segments, and wherein the generating the descriptive MAC address further comprises:

incorporating, by the processing system, the respective index value into an address segment of the second plurality of address segments.

9. The method of claim 7, wherein the physical location reference comprises a bus interconnect location of a local computer expansion bus.

10. The method of claim 9, wherein the bus interconnect location comprises an expansion bus slot number, and wherein the physical location reference further comprises a port identifier of the physical network interface.

11. The method of claim 1, wherein the descriptive MAC address further comprises a second plurality of address segments, and wherein the generating the descriptive MAC address further comprises:

detecting, by the processing system, a virtual machine identifier;

generating, by the processing system, a second group of modified address segments comprising the virtual machine identifier; and replacing, by the processing system, a third group of the second plurality of address segments with the second group of modified address segments.

12. The method of claim 1, wherein the descriptive MAC address further comprises a second plurality of address segments, and wherein the generating the descriptive MAC address further comprises:

generating, by the processing system, a second group of modified address segments comprising an identifier of a physical function of the physical network interface;

generating, by the processing system, a third group of modified address segments according to a universally unique identifier (UUID) of the virtual machine;

generating, by the processing system, a fourth group of modified address segments comprising a bus location of an expansion bus of the physical host processing system in electrical communication with the physical network interface and a port reference of a plurality of ports of the physical network interface;

generating, by the processing system, a fifth group of modified address segments comprising an index reference associated with a virtual function of a plurality of virtual functions configured to share a physical function of the physical network interface; and replacing, by the processing system, first, second, third and fourth groups of the second plurality of address segments with the second, third, fourth, and fifth groups of modified address segments.

13. A device, comprising:

a processing system including a processor; and a memory that stores executable instructions that, when executed by the processing system, facilitate performance of operations, the operations comprising:

receiving a request to initiate a virtual machine on a physical host processing system, wherein the physical host processing system comprises a physical network interface and wherein the virtual machine comprises a virtual network interface;

determining an association between the virtual network interface and the physical network interface;

obtaining a location reference to a physical location of the physical network interface;

adapting a virtual media access control (MAC) address, wherein the virtual MAC address incorporates the location reference, wherein the adapting the virtual MAC address comprises:

detecting a provisioned MAC address of the virtual machine, wherein the provisioned MAC address comprises a plurality of address segments;

generating a first group of modified address segments comprising the location reference; and replacing a first group of the plurality of address segments with the first group of modified address segments; and assigning the virtual MAC address to the virtual network interface of the virtual machine, the physical location of the physical network interface being identifiable from within an environment of the virtual machine via the virtual MAC address.

14. The device of claim 13, wherein the physical host processing system is configured to manage operation of the virtual machine according to single root input/output virtualization (SRIOV) configured to facilitate sharing of the physical network interface among a plurality of virtual machines comprising the virtual machine, wherein a plurality of virtual functions is associated with a physical function, and wherein the physical function is associated with the physical network interface, the plurality of virtual functions configured to facilitate independent network data exchanges for each virtual machine of the plurality of virtual machines.

15. The device of claim 14, wherein the operations further comprise:

associating a respective index value with each virtual function of the plurality of virtual functions, wherein the virtual MAC address further comprises a second plurality of address segments, and wherein the adapting the virtual MAC address further comprises:

incorporating the respective index value into an address segment of the second plurality of address segments.

16. The device of claim 13, wherein the location reference comprises a bus interconnect location of a local computer expansion bus.

17. The device of claim 16, wherein the bus interconnect location comprises an expansion bus slot number, and wherein the location reference further comprises a port identifier of the physical network interface.

18. A non-transitory machine-readable medium comprising executable instructions that, when executed by a processing system including a processor, facilitate performance of operations, the operations comprising:

detecting a request to initiate a virtual machine on a physical host processing system, wherein the physical host processing system comprises a physical network interface and wherein the virtual machine comprises a virtual network interface;

discovering an association between the virtual network interface and the physical network interface;

detecting a physical location of the physical network interface;

generating a physical location reference to the physical location of the physical network interface;

generating a descriptive media access control (MAC) address, wherein the descriptive MAC address incorporates the physical location reference, wherein the generating the descriptive MAC address comprises:

detecting a provisioned MAC address of the virtual machine, wherein the provisioned MAC address comprises a first plurality of address segments;

generating a first group of modified address segments comprising the physical location reference; and replacing a first group of the first plurality of address segments with the first group of modified address segments; and assigning, by the processing system, the descriptive MAC address to the virtual network interface of the virtual machine, the physical location of the physical network interface being identifiable from within an environment of the virtual machine via the descriptive MAC address.

19. The non-transitory machine-readable medium of claim 18, wherein the provisioned MAC address comprises a random MAC address assigned to the virtual machine responsive to an initiation of the virtual machine.

20. The non-transitory machine-readable medium of claim 18, wherein the generating the descriptive MAC address further comprises:

generating, by the processing system, the descriptive MAC address prior to an initiation of the virtual machine on the physical host processing system.

* * * * *